United States Patent
Kiernan et al.

(10) Patent No.: US 9,686,821 B2
(45) Date of Patent: Jun. 20, 2017

(54) STREAMLINED HEATER ASSEMBLY WITH FRONT AND INTERMEDIATE DAISY CHAIN POWER INJECTION, SHIELDING, AND WATER RESISTANT FEATURES

(71) Applicant: MKS INSTRUMENTS, INC., Andover, MA (US)

(72) Inventors: Jeffrey D. Kiernan, Frederick, CO (US); Karl Hausmann, Boulder, CO (US); Paul Dozoretz, Lafayette, CO (US)

(73) Assignee: MKS Instruments, Inc., Andover, MA (US)

( * ) Notice: Subject to any disclaimer, the term of this patent is extended or adjusted under 35 U.S.C. 154(b) by 530 days.

(21) Appl. No.: 14/263,779

(22) Filed: Apr. 28, 2014

(65) Prior Publication Data

US 2015/0312963 A1  Oct. 29, 2015

(51) Int. Cl.
| | |
|---|---|
| H05B 1/02 | (2006.01) |
| F16L 53/00 | (2006.01) |
| H05B 3/04 | (2006.01) |
| H05B 3/58 | (2006.01) |

(52) U.S. Cl.
CPC .......... *H05B 1/0244* (2013.01); *F16L 53/004* (2013.01); *F16L 53/005* (2013.01); *H05B 3/04* (2013.01); *H05B 3/58* (2013.01); *H05B 2203/016* (2013.01)

(58) Field of Classification Search
CPC .......... H05B 1/0244; H05B 3/04; H05B 3/58; H05B 1/02; H05B 2203/016; F16L 53/004

USPC ............... 219/483–487, 497, 494, 508, 490
See application file for complete search history.

(56) References Cited

U.S. PATENT DOCUMENTS

| | | | |
|---|---|---|---|
| 3,675,046 A | 7/1972 | Harkenrider et al. |
| 3,679,871 A | 7/1972 | Evalds |
| 3,689,886 A | 9/1972 | Durkee |
| 3,752,956 A | 8/1973 | Cahill et al. |
| 3,789,190 A | 1/1974 | Orosy et al. |
| 3,796,977 A | 3/1974 | Elliott et al. |
| 3,869,597 A | 3/1975 | Strange |
| 4,086,466 A | 4/1978 | Scharlack |

(Continued)

FOREIGN PATENT DOCUMENTS

| | | |
|---|---|---|
| DE | 4416798 | 11/1995 |
| EP | 1869535 B1 | 11/2010 |

(Continued)

OTHER PUBLICATIONS

European Patent Office, International Search Report and Written Opinion, May 18, 2015, pp. 1-14.

(Continued)

*Primary Examiner* — Mark Paschall
(74) *Attorney, Agent, or Firm* — James R. Young; Cochran Freund & Young LLC

(57) ABSTRACT

Heater modules are configured for streamlined daisy chain connectivity that includes front end and intermediate daisy chain power injection, water resistant heater assemblies, and shielding. A power injection device is configured with connectivity for insertion of power into heater modules that are in front and intermediate daisy chain positions while enabling data communications between heater modules positioned on opposite sides of the power injection locations.

33 Claims, 12 Drawing Sheets

(56) References Cited

U.S. PATENT DOCUMENTS

| | | | |
|---|---|---|---|
| 4,237,369 | A | 12/1980 | Jones |
| 4,268,818 | A | 5/1981 | Davis et al. |
| 4,290,056 | A | 9/1981 | Chow |
| 4,329,569 | A | 5/1982 | Hjortsberg et al. |
| 4,400,688 | A | 8/1983 | Johnston et al. |
| 4,418,333 | A | 11/1983 | Schwarzbach et al. |
| 4,446,462 | A | 5/1984 | Ouellette et al. |
| 4,474,825 | A | 10/1984 | Schmidt |
| 4,506,146 | A | 3/1985 | Rice et al. |
| 4,507,546 | A | 3/1985 | Fortune et al. |
| 4,540,875 | A | 9/1985 | Buttolph, III |
| 5,714,738 | A | 2/1998 | Hauschulz et al. |
| 5,790,354 | A | 8/1998 | Altiti et al. |
| 6,894,254 | B2 | 5/2005 | Hauschulz |
| 7,259,953 | B2 * | 8/2007 | Salerno ............. G05B 19/0423 361/171 |
| 7,932,480 | B2 * | 4/2011 | Gu ....................... H05B 1/0244 219/482 |
| 8,334,483 | B2 * | 12/2012 | Jaccard .................. A47J 31/44 219/442 |
| 2002/0008101 | A1 | 1/2002 | Hauschulz |
| 2007/0235440 | A1 | 10/2007 | Gu et al. |

FOREIGN PATENT DOCUMENTS

| | | |
|---|---|---|
| WO | 9703540 A2 | 1/1997 |
| WO | 2007092474 A1 | 8/2007 |

OTHER PUBLICATIONS

MKS Instruments, Inc.; Vacuum Technology Series 46 Heaters—Heater Jackets for Stainless Steel Tubing; Bulletin Aug. 2012; MKS Vacuum Technology, Boulder, Colorado; MKS Global Headquarters, Andover, Massachusettes; 18 pages.

Briskheat; "Centipede Temperature Controllers"; 2009-2013; 3 pages (Oct. 3 to Oct. 5); 12th Edition; accessed at http://www.briskheat.com/centtemperaturecontrol.aspx.

Briskheat; Centipede 2 Temperature Control System; 2009-2013; 6 pages (p. 82-86); 12th Edition; accessed at http://www.briskheat.com/c-118-new-centipede-2-temperature-control-system.aspx.

* cited by examiner

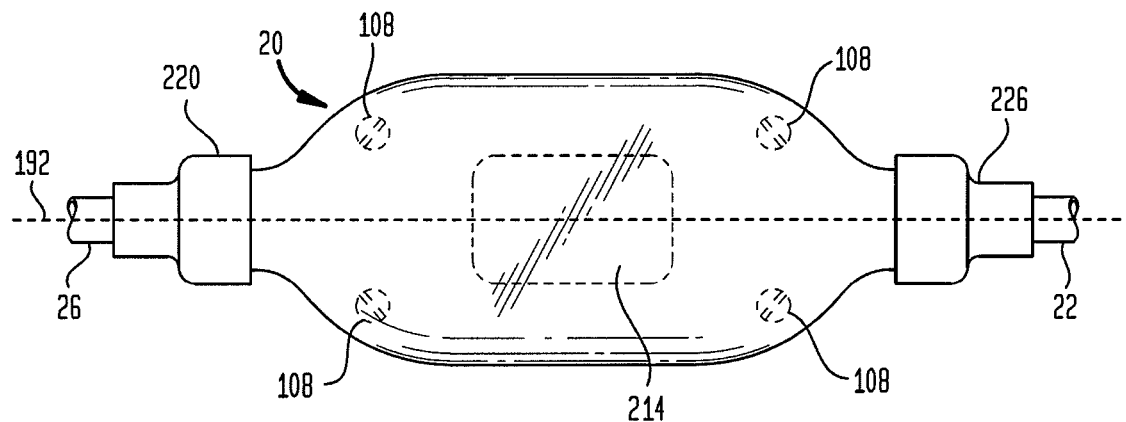
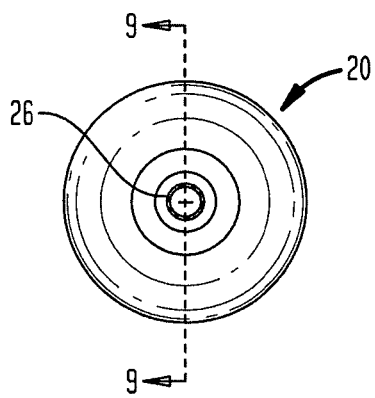
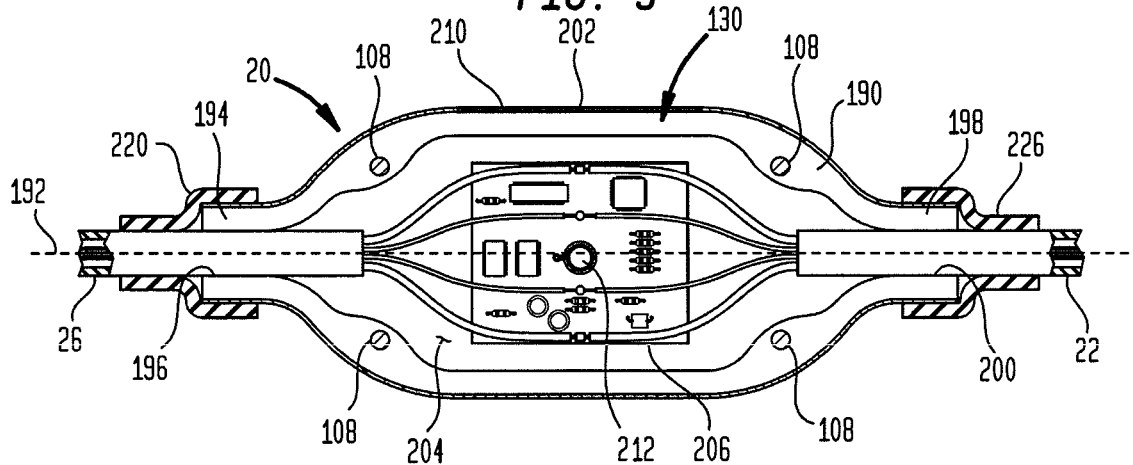

STREAMLINED HEATER ASSEMBLY WITH FRONT AND INTERMEDIATE DAISY CHAIN POWER INJECTION, SHIELDING, AND WATER RESISTANT FEATURES

BACKGROUND

Technical Field of the Invention

The present invention is related to heaters, including heater assemblies with multiple heater modules for heating pipes, valves, and other piping system components.

State of the Prior Art

Many vacuum, process, transport, and other systems used in industry for conducting or moving various gaseous, liquid, or solid materials from one point to another include pipes, valves, and other pipe system components of various lengths, sizes, and shapes that have to be heated to maintain the pipes and/or materials in the pipes within certain temperature ranges. Pipe heaters for heating pipes for these and other purposes are well known to persons skilled in the art and have ranged from simple resistive wires and tape wrapped around the pipes to more sophisticated, insulated pipe heaters, such as those described in U.S. Pat. No. 5,714,738 (Hauschultz et al.), which is incorporated herein by reference, as well as many such heater products that are available commercially.

Along with the development of pipe heaters for various pipe heating applications, there was also a need for better pipe heater control systems for regulating heat output from the heaters along lengths of pipe and for monitoring and controlling such heater operations. There are many kinds and configurations of such heater control systems, such as the ones described in U.S. Pat. No. 6,894,254 (Hauschultz), which is also incorporated herein by reference. More versatility in pipe heater assemblies and better control features have also been developed, for example, in U.S. Pat. No. 7,932,480 (Gu, et al.) and U.S. Pat. No. 8,541,716 (Gu, et al.), both of which are incorporated herein by reference. However, such versatility and features have added complexity and components that are cumbersome to assemble and difficult to mount, and, when installed on piping systems, are susceptible to water leakage and damage from moisture incursion, magnetic interference, enhanced radio frequency (RF) electromagnetic radiation interference, ultraviolet UV) radiation, and other environmental issues, and they are somewhat messy and susceptible to snagging, inadvertent disconnection, and other problems.

The foregoing examples of the related art and limitations related therewith are intended to be illustrative and not exclusive. Other limitations of the related art and other examples of related art will become apparent to those of skill in the art upon a reading of the specification and a study of the drawings.

SUMMARY

The following embodiments and aspects thereof are described and illustrated in conjunction with systems, tools and methods which are meant to be examples and illustrative, not limiting in scope. In various embodiments and implementations, one or more of the above-described problems have been reduced or eliminated, while other embodiments are directed to other improvements and benefits.

Heater apparatus comprising one or more heater modules are connectable in daisy chain fashion with one or more power injection devices for providing power to the heater modules. In one example embodiment each heater module comprises a heater, a controller device connected to the heater by a primary heater cord, the controller device comprising a front end connector having a primary high voltage power terminal, a primary neutral terminal, and at least a first primary communication terminal, and a secondary heater cord extending from the controller device to a back end connector that includes a back end neutral terminal, a back end high voltage power terminal, and at least a first back end communication terminal, the back end connector 34 being configured in a manner that is capable of mating connection to the front end connector including mating electrical connection of the back end high voltage power terminal to the primary high voltage power terminal, mating electrical connection of the back end neutral terminal to the primary neutral terminal, and mating communication connection of the first back end communication terminal to the first primary communication terminal.

In one embodiment, a power injection device comprises an injection device power input connector, including an injection device high voltage input terminal and an injection device neutral input terminal, an injection device communication input connector, including at least a first injection device communication input terminal, said injection device communication input connector being configured in a manner that is capable of mating connection to the back end connector including mating communication connection of the first injection device communication input terminal to the first back end communication terminal, and an injection device combination power and communication output connector, including an injection device high voltage power output terminal, an injection device neutral output terminal, and at least a first injection device communication output terminal, said injection device combination power and communication output connector being configured in a manner that is capable of mating connection to the front end connector including mating electrical connection of the injection device high voltage power output terminal to the primary high voltage power terminal, mating electrical connection of the injection device neutral output terminal to the primary neutral terminal, and mating communication connection of the first injection device communication output terminal to the first primary communication terminal. In one embodiment, the secondary heater cord extends from the controller device and through the heater to the back end connector. In another embodiment, the secondary heater cord extends directly from the controller device to the back end connector. In another embodiment, the secondary heater cord extends from the controller device through a T-junction device to the back end connector.

In one embodiment, the power injector device includes an injection device high voltage power conductor connected electrically to the injection device high voltage power input terminal and to the injection device high voltage power output terminal, an injection device neutral conductor connected electrically to the injection device neutral input terminal and to the injection device neutral output terminal, and at least a first injection device communication conductor connected to the first injection device communication input terminal and to the first injection device communication output terminal.

In one embodiment, the front end connector and the back end connector of the heater apparatus are both of a type that provides a water tight seal for the primary high voltage power terminal, the primary neutral terminal, the first primary communication terminal, the back end high voltage power terminal, the back end neutral terminal, and the first back end communication terminal.

In one embodiment, the front end connector, the back end connector, the injection device communication input connector, and the injection device combination power and communication output connector of the heater apparatus are all of a type that provides water tight seals for the back end high voltage power terminal, the back end neutral terminal, the first back end communication terminal, the first injection device communication input terminal, the injection device high voltage power output terminal, the injection device neutral output terminal, the first injection device communication output terminal, the primary high voltage power terminal, the primary neutral terminal, the first primary communication terminal.

In one embodiment, the heater apparatus comprises a controller housing 130 with an outside wall, which is shaped substantially as a figure of revolution extending along a controller longitudinal axis between a housing front end that is shaped substantially as a figure of revolution, which defines a front aperture, and a housing back end that is shaped substantially as a figure of revolution, which defines a back aperture. The controller housing has an external surface and encloses an interior controller chamber. In one embodiment, the protective shield is a heat-shrunk material. In another embodiment, the protective shield is impermeable to water. In another embodiment, the protective shield is chemically inert. In another embodiment, the protective shield is a magnetic field shielding material. In another embodiment, the protective shield is an RF shielding material. In another embodiment, the protective shield is impervious to dust. In another embodiment, the protective shield reflects or absorbs ultraviolet radiation. In another embodiment, the protective shield is cushion material. In another embodiment, the protective shield is a thermal insulation material. In another embodiment, the protective shield is a material that transmits at least some visible light.

In one embodiment, the heater apparatus includes a controller housing with a front aperture and a back aperture, a front end cord that extends through the front aperture, a primary heater cord that extends through the back aperture, a water-impermeable front boot that extends over both the front end of the housing, including extending over a front end portion of the protective shield and over a portion of the front end cord that is external to the housing. In one embodiment the front boot and the back boot comprise heat-shrunk material.

In one embodiment, the heater apparatus includes a heater element in the heater and least one temperature sensor adjacent to the heater element.

In one embodiment, the controller device of the heater apparatus includes a controller housing that at least partially contains: (i) a primary neutral conductor that extends from the primary neutral terminal, through the controller housing and through the primary heater cord, to the heater where the primary neutral conductor is connected electrically to the heater element and to a secondary neutral conductor which extends through the secondary heater cord to the back end neutral terminal; (ii) a primary high voltage power conductor that extends from the primary high voltage power terminal, through the controller housing, and through the primary heater cord to the heater where the primary high voltage power conductor is connected electrically to a secondary high voltage power conductor, which extends through the secondary heater cord to the back end high voltage power terminal; and (iii) at least a first primary communication conductor that extends from the first primary communication terminal, through the controller housing and through the primary heater cord, to the heater where the first primary communication conductor is connected to a first secondary communication conductor which extends through the secondary heater cord to the first back end communication terminal.

In one embodiment, the controller housing contains: (i) control circuitry configured for controlling temperature of the heater based at least in part on temperature sensed by at least one temperature sensor and for turning high voltage power to the heater element off in response to temperature sensed by at least one temperature sensor in excess of a high limit temperature parameter; and (ii) communication circuitry configured for generating communications signals.

In one embodiment, the heater apparatus includes: (i) temperature signal conductors, extending from the temperature control circuitry, through the primary heater cord, and into the heater, said temperature signal conductors being connected electrically to at least one temperature sensor in the heater and to the temperature control circuitry; and (ii) a controlled high voltage power conductor extending from the control circuitry in the controller housing, through the primary heater cord, and into the heater where the controlled high voltage power conductor is connected electrically to the heater element, and wherein the control circuitry connects and disconnects the controlled high voltage power conductor to and from the primary high voltage power conductor to control heat production by the heating element in response to temperature sensed by a first temperature sensor.

In one embodiment: (i) the front end connector includes a second primary communication terminal; (ii) the back end connector includes a second back end communication terminal and is configured in a manner that is capable of mating communication connection of the second back end communication terminal to the second primary communication terminal; (iii) the injection device communication input connector includes a second injection device communication input terminal, and the injection device communication input connector is configured in a manner that is capable of mating connection to the back end connector including mating communication connection of the second injection device communication input terminal to the second back end communication terminal; and (iv) the injection device combination power and communication output connector includes a second injection device communication output terminal, and the injection device combination power and communication output connector is configured in a manner that is capable of mating connection to the front end connector including mating communication connection of the second injection device communication output terminal to the second primary communication terminal.

A power injection device is configured with connectivity for insertion of power into heater modules that are in front and intermediate daisy chain positions while enabling data communications between heater modules positioned on opposite sides of the power injection locations. In one embodiment, the power injection device includes: (i) an injection device high voltage power conductor connected electrically to the injection device high voltage power input terminal and to the injection device high voltage power output terminal; (ii) an injection device neutral conductor connected electrically to the injection device neutral input terminal and to the injection device neutral output terminal; (iii) a first injection device communication conductor connected to the first injection device communication input terminal and to the first injection device communication output terminal; and (iv) a second injection device communication conductor connected to the second injection device communication input terminal and to the second injection device communication output terminal.

In one embodiment, the heater apparatus includes an auxiliary communication cord which has an auxiliary communication output connector on one end that includes a first auxiliary communication output terminal and a second auxiliary communication output terminal. The auxiliary communication output connector is configured in a manner that is capable of mating connection to the injection device communication input connector, including mating communication connection of the first auxiliary communication output terminal to the first injection device communication input terminal and mating communication connection of the second auxiliary communication output terminal to the second injection device communication input terminal.

In another embodiment, a power injection device comprises: (i) an injection device power input connector, including an injection device high voltage input terminal and an injection device neutral input terminal; (ii) an injection device power input connector, including an injection device high voltage input terminal and an injection device neutral input terminal; (iii) an injection device communication input connector, including at least a first injection device communication input terminal; (iv) an injection device combination power and communication output connector, including an injection device high voltage power output terminal, an injection device neutral output terminal, and at least a first injection device communication output terminal.

In one embodiment, the injection device communication input connector of the power injection device includes a second injection device communication input terminal, and the injection device includes a combination power and communication output connector of the power injection device.

In one embodiment, the power injection device includes: (i) an injection device high voltage power conductor connected electrically to the injection device high voltage power input terminal and to the injection device high voltage power output terminal; (ii) an injection device neutral conductor connected electrically to the injection device neutral input terminal and to the injection device neutral output terminal; (iii) a first injection device communication conductor connected to the first injection device communication input terminal and to the first injection device communication output terminal; and (iv) a second injection device communication conductor connected to the second injection device communication input terminal and to the second injection device communication output terminal.

Another aspect of the invention includes a method of providing power to and communication data to or from a plurality of heater modules that are daisy-chain connected together, each of which heater modules 12 comprises a heater element in a heater, a controller device connected to the heater by a primary heater cord, high voltage power conductors, neutral conductors, and communication conductors extending from the controller device, through the primary heater cord to the heater, and through a secondary heater cord extending from the heater for connection to the controller device of another one of the heater modules. In one embodiment, the method comprises: (i) injecting power into a first one of the heater modules while passing communication data into or out of said first one of the heater modules by connecting a first power injection device to the first one of the heater modules and providing power from a high voltage power source through an injection device power input connector and out of an injection device combination power and communication output connector to the first one of the heater modules; and (ii) injecting auxiliary power into another one of the heater modules in the daisy-chain of heater modules by connecting a second power injection device into said another one of the heater modules and connecting the secondary heater cord of an intermediate heater module in the daisy chain of heater modules to the second power injection device to transmit communication data between the said another one of the heater modules and the said intermediate heater module through the power injection device.

Another aspect of the invention includes a method of providing a water-resistant heater assembly that includes a plurality of heater modules connected electrically in daisy chain fashion, wherein each heater module has a heater containing a heating element powered by high voltage electric power and at least one temperature sensor positioned in the heater adjacent to the heater element, and wherein each heater module also has a controller device connected electrically to a high voltage power source and to the heater element and to the temperature sensor in the heater. In one embodiment, the method comprises: (i) providing the controller device of each heater module with a housing that has an outside wall which is shaped substantially as a figure of revolution extending along a controller longitudinal axis between a housing front end shaped substantially as a figure of revolution that defines a front aperture, and a housing back end shaped substantially as a figure of revolution that defines a back aperture, said housing having an external surface 202 and enclosing an interior controller chamber; (ii) positioning the controller device a distance apart from the heater; (iii) providing each heater module with no more than one electrical input connector and no more than one electrical output connector, said electrical input connectors and electrical output connectors of the heater modules being connectable together in a water tight manner that resists leakage of water into contact with electrical conductors and the terminals in the electrical input connectors and electrical output connectors; (iv) extending a high voltage power conductor, a neutral conductor, and at least one data communication conductor between the electrical input connector of the heater module and the electrical output connector of same heater module including through the housing of the controller device; (v) shrink-wrapping a water impermeable, protective shield around the housing of the controller; and (vi) connecting a plurality of heater modules together in daisy chain fashion by connecting the electrical output connectors 34 of one or more heater modules to the electrical input connectors of one or more other heater modules.

In another aspect of the invention, power injection apparatus is configured for providing power to and communication data to or from a plurality of heater modules that are daisy-chain connected together, each of which heater modules comprises a heater element in a heater, a controller device connected to the heater by a primary heater cord, high voltage power conductors, neutral conductors, and communication conductors extending from the controller device, through the primary heater cord to the heater, and through a secondary heater cord extending from the heater for connection to the controller device 20 of another one of the heater modules. In one embodiment, the power injection apparatus comprises: (i) means for injecting power into a first one of the heater modules while passing communication data into or out of said first one of the heater modules; and (ii) means for injecting auxiliary power into another one of the heater modules in the daisy-chain of heater modules by connecting a second power injection device into said another one of the heater modules and connecting the secondary heater cord of an intermediate heater module in the daisy chain of heater modules to the second power injection device to transmit communication data between the said another one of the heater modules and the said intermediate heater module through the power injection device.

In another aspect of the invention, a water-resistant heater assembly is provided by apparatus that includes a plurality of heater modules connected electrically in daisy chain fashion, wherein each heater module has a heater containing a heating element powered by high voltage electric power and at least one temperature sensor positioned in the heater adjacent to the heater element, and wherein each heater module also has a controller device connected electrically to a high voltage power source and to the heater element and to the temperature sensor in the heater. In one embodiment, the apparatus comprises: (i) means for providing the controller device of each heater module with a housing that has an outside wall which is shaped substantially as a figure of revolution extending along a controller longitudinal axis between a housing front end which is shaped substantially as a figure of revolution and which defines a front aperture, and a housing back end which is shaped substantially as a figure of revolution and which defines a back aperture, said housing having an external surface and enclosing an interior controller chamber; (ii) means for positioning the controller device a distance apart from the heater with electrically conductive components extending between the controller device and the heater; (iii) means for providing each heater module with no more than one electrical input connector and no more than one electrical output connector, said electrical input connectors and electrical output connectors of the heater modules being connectable together in a water tight manner that resists leakage of water into contact with electrical conductors and the terminals in the electrical input connectors and electrical output connectors; (iv) means for extending a high voltage power conductor, a neutral conductor, and at least one data communication conductor between the electrical input connector of the heater module and the electrical output connector of same heater module including through the housing of the controller device; (v) a water impermeable, protective shield shrink-wrapped around the housing of the controller; and (vi) a plurality of heater modules connected together in daisy chain fashion with the electrical output connectors of one or more heater modules connected to the electrical input connectors of one or more other heater modules.

In another example embodiment, a method of providing power to and communication data to or from a plurality of heater modules is provided. The method in the example embodiment is applicable at least to heater modules that are daisy-chain connected together, each comprising a heater element in a heater body, a controller device connected to the heater body by a primary heater cord, high voltage power conductors, neutral conductors, and communication conductors extending from the controller device, through the primary heater cord to the heater body, and through a secondary heater cord extending from the heater body for connection to the controller device of another one of the heater modules. The method of the example embodiment includes injecting power into a first one of the heater modules while passing communication data into or out of said first one of the heater modules by connecting a first power injection device to the first one of the heater modules and providing power from a high voltage AC power source through an injection device power input connector and out of an injection device combination power and communication output connector to the first one of the heater modules, and injecting auxiliary power into another one of the heater modules in the daisy-chain of heater modules by connecting a second power injection device into said another one of the heater modules and connecting the secondary heater cord of an intermediate heater module in the daisy chain of heater modules to the second power injection device to transmit communication data between the said another one of the heater modules and the said intermediate heater module through the power injection device.

In addition to the example aspects, embodiments, and implementations described above, further aspects, embodiments, and implementations will become apparent to persons skilled in the art after becoming familiar with the drawings and study of the following descriptions.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings:

FIG. 7 is an enlarged side elevation view of a representative one of the example controller devices shown in FIG. 1;

FIG. 8 is an end elevation view of the representative example controller device in FIG. 7;

FIG. 9 is a cross-section view of the controller device taken along section lines 9-9 in FIG. 8;

DETAILED DESCRIPTIONS OF EXAMPLE EMBODIMENTS

Figure 1:
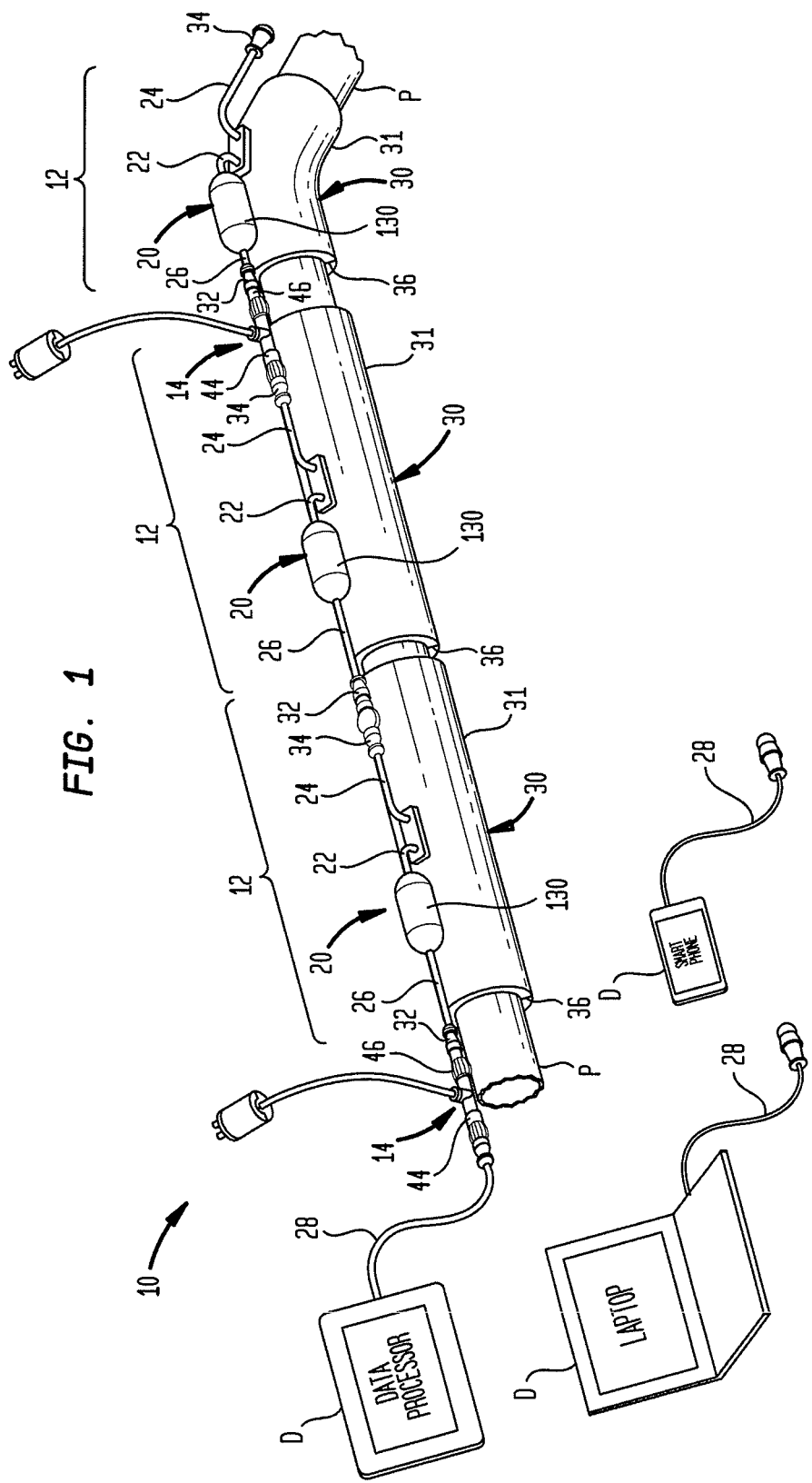
FIG. 1 is a perspective view of an example pipe heater assembly comprising several heater modules in an in-line connection configuration.

An example assembly of heater apparatus 10 is illustrated in FIG. 1, including three example heater modules 12 connected together electrically in a daisy chain fashion, i.e., in an interlinked series of heater modules 12. The example heater modules 12 illustrated in FIG. 1 are configured for mounting on pipes P to be heated, but such heater modules 12 are not limited to configurations for mounting on pipes or to uses for heating pipes. They can be made in just about any configuration and can used for heating any of a variety of objects or materials. A power injection device 14 is configured with connectivity for insertion of power into the heater modules 12 that are in front and intermediate daisy chain positions while enabling data communications between heater modules 12 that are positioned on opposite sides of the power injection locations. The example assembly of heater apparatus 10 shown in FIG. 1 includes two example power injection devices 14 for providing high voltage electric power to the heater modules 12. One of power injection devices 14 is shown in FIG. 1 connected electrically to the first heater module 12 in the daisy-chained assembly, and the other power injection device 14 is illustrated for example as being connected between the second and third heater modules 12. The heater modules 12 are water resistant, but can be provided in other embodiments, including other protections for various environmental conditions or without such protections as will be explained in more detail below.

The design and structure of the example heater modules 12 provide complete connectability of the heater modules to electric power, to data communications, and to each other as well as complete electrical connections between the controller devices 12 and the respective heaters 30 with only two connectors, e.g., the front end connector 32 and the back end connector 34. Complete power, process temperature and high limit temperature sensing and controls, and data communications to and from each heater module 12 as well as connection of the heater module 12 to another heater module 12 are provided via those two connectors. There are no other power, data communication, or other connectors into or out of either the controller devices 20 or the heaters 30 that have to be connected to provide the full functionalities of the heater modules 12 as will be explained in more detail below. Therefore, the electrical connections of the heater modules 12 together in daisy chain fashion as shown in FIG. 1 are not only neat and easy, but limiting the connections into and out of each heater module 12 to just two connectors, e.g., the front end connector 32 and the back end connector 34, facilitates making the heater modules 12 resistant to water leakage and moisture incursion as well as resistant to other detrimental environmental factors as will also be explained below.

Each heater module 12 requires some level of electric power to power its heating function. The amount of power required for the heating function depends on the heater module 12 design and how much heat it produces in an application. In typical pipe heater products, including this example assembly of heater apparatus 10, high voltage power is used to power the heat-producing elements in the heaters. In typical industrial process applications, 110-120 volt, 15 to 30 amp, AC electric power is satisfactory and often used for powering the heaters 30, although higher voltages, e.g., 220-240 volt AC or 440-480 volt AC, may also be used, for example, in Europe, military applications, and others. Lower voltages, for example when powering the heaters 30 with DC electric power, also have some applications, for example in portable or remote situations. For example, in some such installations, 24 volt or 30 volt DC power for powering the heaters 30 is used. These examples are not exhaustive or exclusive, and other AC or DC voltages can also be used to power the heaters 30. In general, in this context and as used in this description, the term "high voltage" is used when referring to the electric power used to power the heating elements 60 (not seen in FIG. 1, but illustrated in FIGS. 4, 5, 11, and 13) of the heaters 30, regardless of what the particular voltage actually is for that function in a particular heater apparatus 10.

The controller devices 20, which will also be described in more detail below, include electronic components and communications, data, and control signals that operate with low voltage power, for example 3 to 6 volts, although other voltages may also be used, for example, 9, 12, or 14 volts. Persons skilled in the art understand how to design and power electronic circuits and components, control signals, communications signals, and other electronic functions with appropriate power levels, and they understand the term low voltage in this context. For purposes of this description, the term "low voltage" is used when referring to the electric power for electronic components and circuits, control signals, data signals, and communications signals, regardless of what the particular voltage actually is for those functions or electronic components and circuits. In some designs and circuits, the "low voltage" power for powering electronic components and circuits, control signals, data signals, and communications signals is derived from "high power" conductors, for example, by connecting a low voltage power supply component to a high power line for converting high power to low power for use in powering the electronic components and circuits, control signals, data signals, or communications signals. In such circumstances, the electric power used to actually power the electronic components and circuits, control signals, data signals, or communications signals is still referred to in this description as "low voltage" power, even though the power was initially derived by the low voltage power supply from high voltage conductors.

The high voltage electric power for the heater modules 12 can be conducted from one heater module 12 to the next heater module 12 in a daisy chain assembly by the primary heater cords 22 and the secondary heater cords 24 of the respective heater modules 12. As shown in FIG. 1, the secondary heater cord 24 of one heater module 12 connects to the controller device 20 of the next heater module 12 in the daisy-chain. The connection of the controller device 20 to the secondary heater cord 24 of a preceding heater module 12 is facilitated with a front end cord 26, as shown in FIG. 1. Alternatively, the secondary heater cord 24 of one heater module 12 could be connected directly to the controller device 20 of the next heater module 12 with appropriate connectors (not shown) as would be understood by persons skilled in the art. This description will proceed with connections made to the controller devices 20 via the front end cords 26, but with the understanding that the front end cords 26 are not necessary for connection of either a secondary cord 24 or a power injection device 14 to the controller device 20.

The primary heater cords 22, secondary heater cords 24, and front end cords 26 also have communication conductors, as will be described in more detail below, to conduct communications data from one heater module 12 to the next heater module 12. Such communications data can be conducted in either direction, i.e., from one heater module 12 to the next succeeding heater module 12 in the daisy chain or from one heater module 12 to a preceding heater module 12 in the daisy chain. Data communications can also be conducted back and forth between the control modules 12 and one or more base station, monitoring, or programming devices D, for example, the data processor D, laptop computer D, or smart phone D illustrated in FIG. 1, or any other such device as will be understood by persons skilled in the art. For convenience, any such device is referred in this description as a data processing device D.

As mentioned above, each heater module 12 requires some level of electric power for its heating function, depending on the heater module 12 design and how much heat it produces in an application. Persons skilled in the art understand that power is the product of electric current I squared times resistance R, thus $I^2R$. According to Ohm's Law, voltage V=IR. Therefore, for a given resistance R in a heater and a given voltage V, a certain amount of current I (amps) is required by each heater 30. Therefore, the primary heater cords 22, secondary heater cords 24, and front end heater cords 26 have to have the capacity to carry the current (amps) required for all of the heater modules 12 that are powered through those cords 22, 24, 26. The more heater modules 12 that are powered through the cords 22, 24, 26, the larger the high voltage electric conductors in those cords have to be. Cords 22, 24, 26 with large gauge electric conductors can be used to power more and larger heaters, as would be understood by persons skilled in the art, but very large gauge conductors are bulky and expensive. Persons skilled in the art also understand that in the American wire gauge (AWG) system, increasing AWG gauge numbers designate decreasing wire diameters, and decreasing AWG gauge numbers designate increasing wire diameters. The term "large gauge" used in this context refers to large diameter wire, thus would be designated with a small AWG gauge number.

In the example assembly of heater apparatus 10 illustrated in FIG. 1, cords 22, 24, 26 are provided with sufficiently large gauge conductors to accommodate the amps of current needed to power a moderate number of heater modules 12 connected in a daisy chain, for example, but not for limitation, perhaps eight to twenty heater modules 12, depending, of course, on the size (current draw) of each heater module 12. Fewer heater modules 12 than the eight to twenty mentioned above are shown daisy chain connected together in FIGS. 1, 2, 4, and 10-13 in order to avoid clutter in the drawings and unnecessary repetition with additional heater modules 12, but the principles are illustrated and understandable to persons skilled in the art who would be able to daisy chain connect any desired numbers of heaters 30 once they become familiar with the principles described herein. Accordingly, the power injection device 14 connected to the first heater module 12 in the daisy chain shown in FIG. 1 is illustrated as providing power to the two heater modules 12 in the daisy chain. Then, to power the third heater module 12 in FIG. 1, another power injection device 12 is connected to the third heater module 12 between the secondary heater cord 24 of the second heater module 12 and the front end cord 26 of the third heater module 12.

As will be explained in more detail below, the power injection device 14 is structured and configured to conduct power from a source of high voltage electric power into the front end cord 26 or controller device 20 and to conduct data communications between heater modules 12 that are daisy chain connected together by the power injection device 14, but the power injection device 14 does not make an electrical connection between the high-power conductors in one heater module 12, through the power injection device 14, to the next heater module 12. Therefore, when a power injection device 14 is connected between two heater modules 12, as illustrated between the second and third heater modules 12 in FIG. 1, data communications are conducted between those two heater modules 12, but heater modules 12 after the power injection device 14 are powered with electric power delivered by the power injection device 14, not by power from any heater module 12 that precedes the power injection device 14 in the daisy chain.

As mentioned above, a data processing device D can be connected to the heater modules 12 for receiving data communications from one or more of the heater modules 12 or for providing data communications to one or more of the heater modules 12. For example, the controller devices 20 of the heater modules 12 may be equipped to output data relating to sensed temperatures, operating within certain temperature ranges, overheating, or other data, which the data processing device D can receive for processing, display, alarm or alert responses, or other functions as would be understood by persons skilled in the art. The controller devices 20 may also be equipped to receive data communications from a data processing device D. For example, temperature set points, temperature operating ranges, duty cycles, queries, shutdown signals, or other data communications may be received by the controller devices D. Since the power injection devices 14 conduct data communications as explained above, the controller devices D can be connected to the controller devices 20 for data communications through an auxiliary communication cord 28 to the power injection device 14 that is connected to the first of the heater modules 14 in the daisy chain, as illustrated in FIG. 1 and as will be explained in more detail below.

The example heater module 14 includes a heater 30 that is adapted for placement on a pipe P or other pipe system component (not shown), for example, a valve, meter, Tee, coupling, trap, or any of myriad other components. The example heater 30 shown in FIGS. 1 and 2 can be structured similar to the heaters described in one or more of the U.S. Pat. Nos. 5,714,738, 6,894,254, 7,932,480, and 8,541,716, which are incorporated herein by reference for all that they disclose, wherein a heater element 60 and one or more temperature sensors 62, 64 (see FIGS. 4 and 5) are embedded in heater body 31 (FIGS. 1 and 2) comprising insulating foam material. A longitudinal split 36 along the heater body 31 facilitates spreading the heater body 31 open enough to place the heater 30 on the pipe P (FIG. 1), whereupon the heater body 31 closes around the pipe P.

A front end connector 32 (sometimes referred to as input connector) is provided on the front end cord 26 (or directly on the controller device 20 in the absence of a front end cord 26), and a back end connector 34 (sometimes referred to as output connector) is provided on the secondary heater cord 24. The front end connector 32 and the back end connector 34 are configured in such a manner that they are capable of mating connection to each other in a manner that would connect the high voltage conductors in the respective cords 24, 26 electrically together and that would connect the communication conductors in the respective cords 24, 26 together. Of course, it is not expected that the front end connector 32 of a heater module 12 would be connected to the back end connector 34 of the same heater module 12, but the connectors 32, 34 are configured in that manner so that the back end connector 34 of one heater module 12 is connectable in a mating manner to the front end connector 32 of another heater module 12 to thereby enable convenient daisy chain connections of multiple heater modules 12 as illustrated in FIGS. 1 and 2 and as explained in more detail below.

Figure 2:
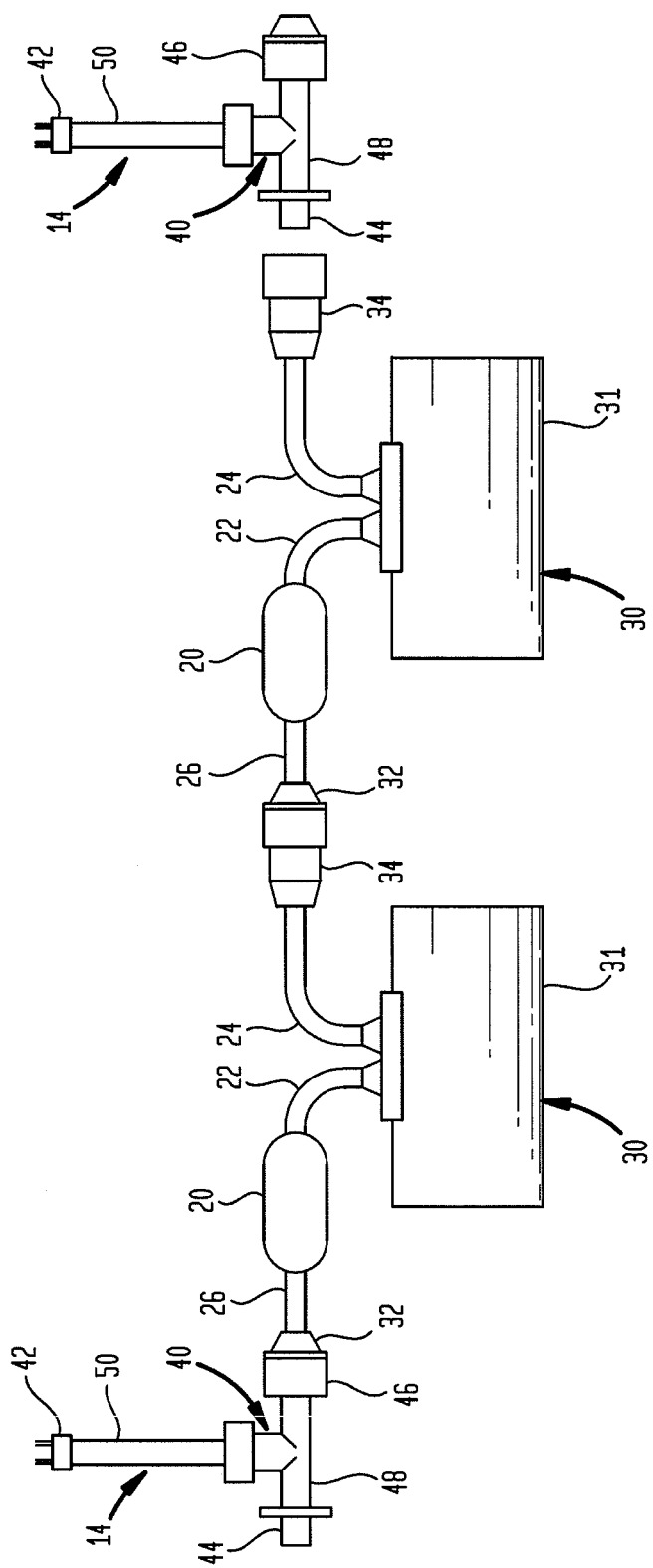
FIG. 2 is a side elevation view of two of the example heater modules in FIG. 1 along with two example power injection devices.
Figure 3:
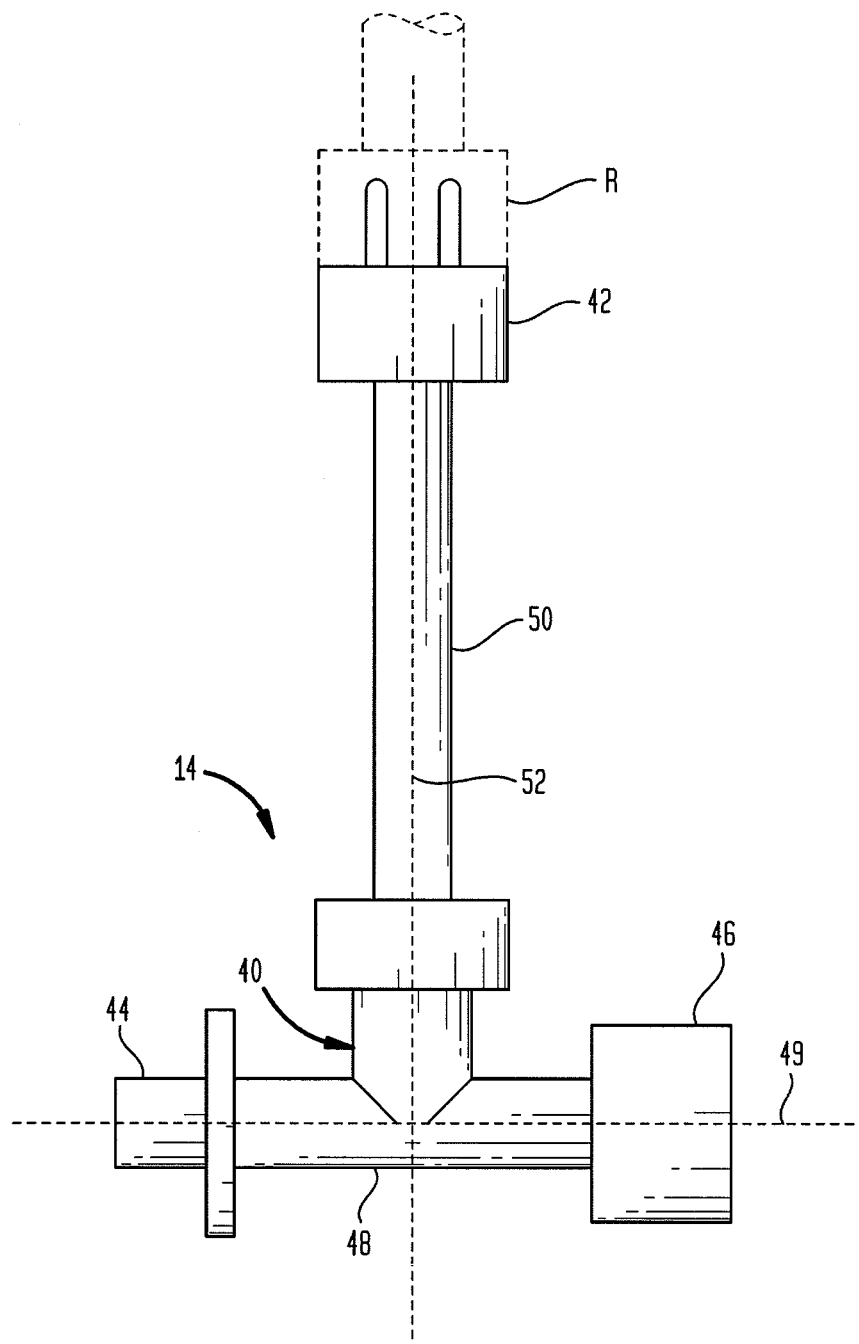
FIG. 3 is side elevation view of a representative one of the example power injection devices shown in FIG. 2.
Figure 4:
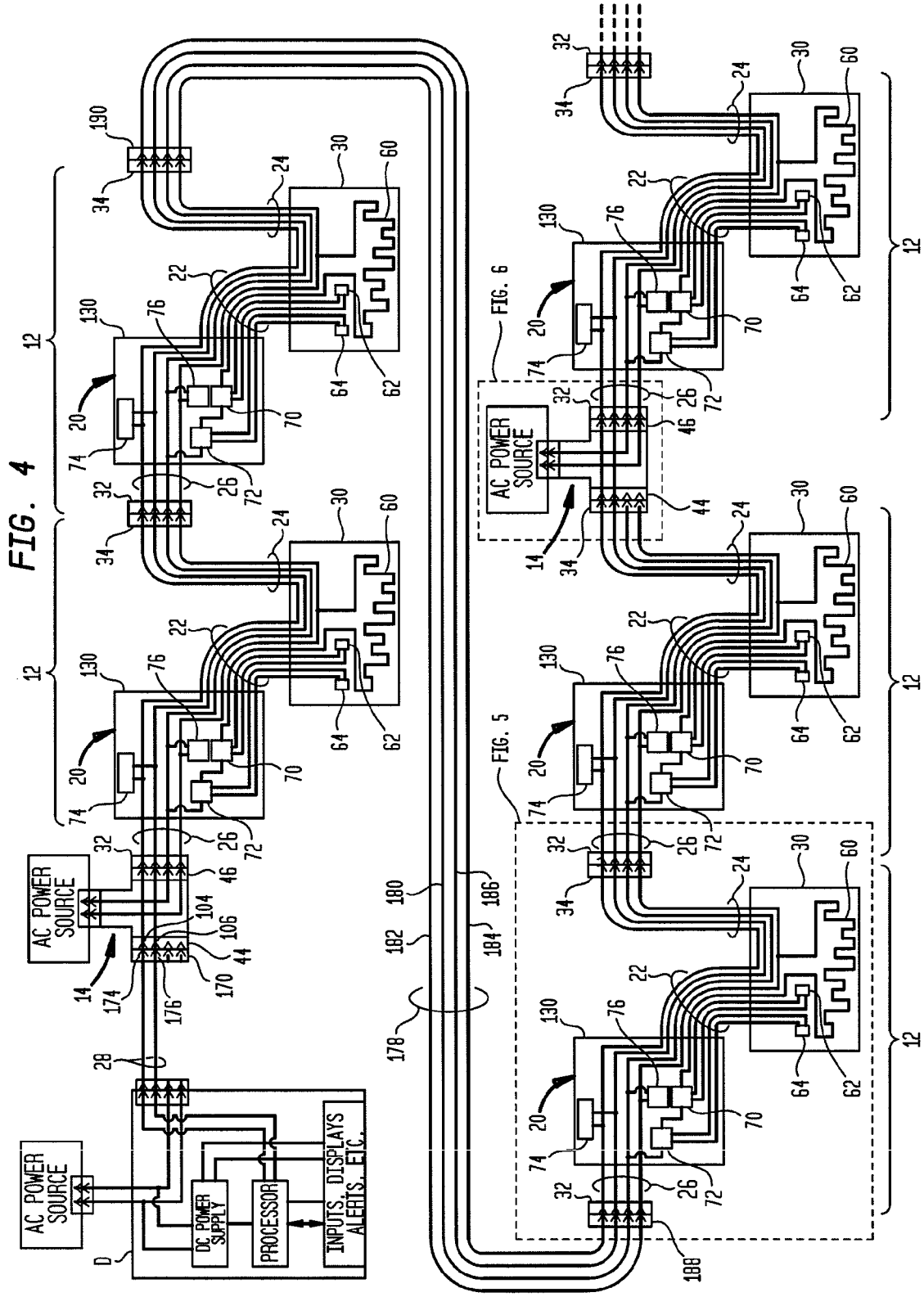
FIG. 4 is schematic diagram of several example heater modules assembled together in in-line daisy chain connected fashion with an example power injection device connected to the first heater module in the daisy chain and another power injection device connected between two intermediate heater modules.
Figure 5:
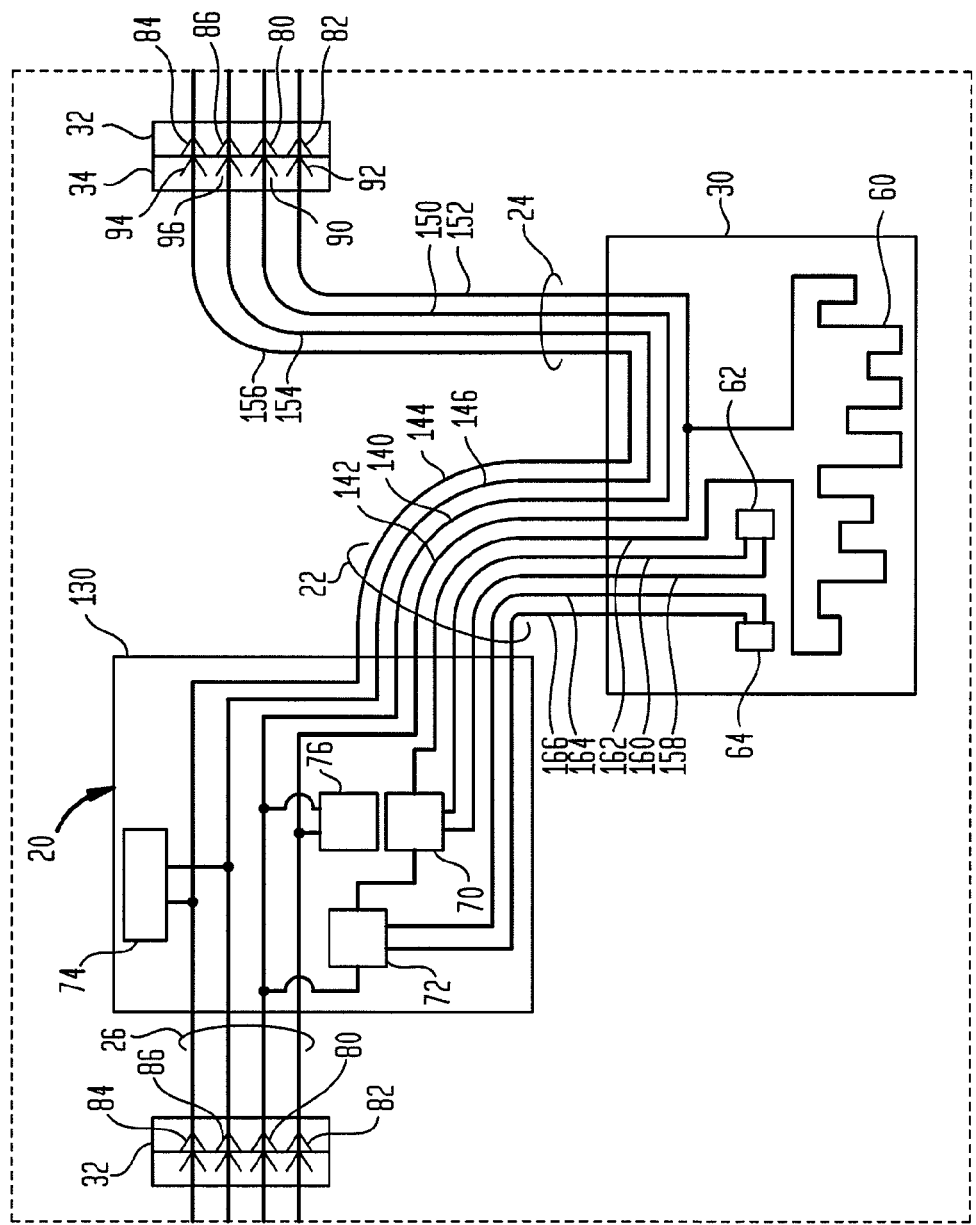
FIG. 5 is an enlarged schematic diagram of a representative one of the example heater modules in FIG. 4.
Figure 6:
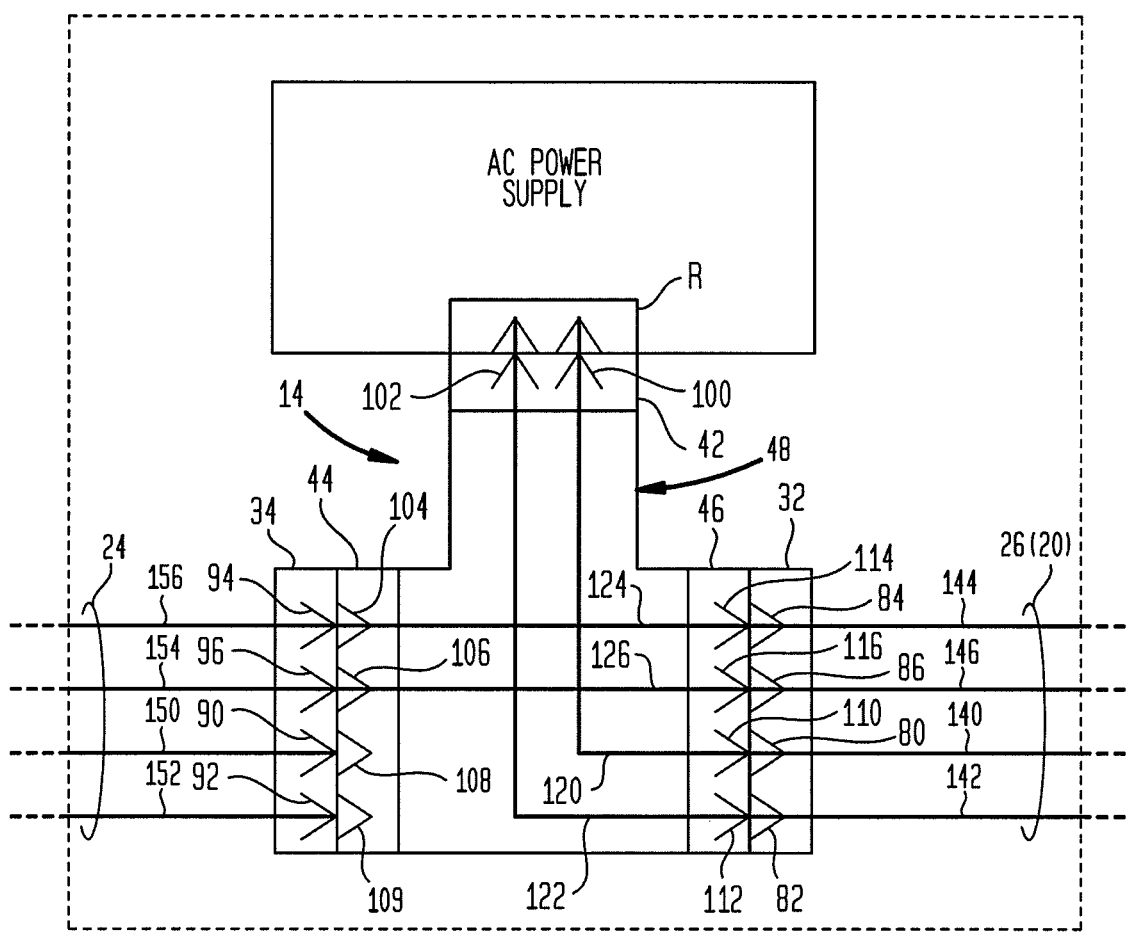
FIG. 6 is an enlarged schematic diagram of a representative one of the example power injection devices in FIG. 4.

The example power injector devices 14 illustrated in FIGS. 1, 2, and 3 are illustrated in more detail in the enlarged elevation views of FIGS. 2 and 3 and in the schematic diagrams in FIGS. 4 and 6. Therefore, with initial reference primarily to enlarged elevation views in FIGS. 2 and 3, each example power injector device 14 in FIGS. 2 and 3 comprises a core 40 that has three connectors, e.g., an injection device power input connector 42, an injection device communication input connector 44, and an injection device combination power and communication output connector 46. The core 40 can be a solid body, a flexible body, inter-connected cords, or a combination of such features or characteristics. The example core 40 shown in FIGS. 2 and 3 has a solid T-section 48 extending along a longitudinal axis 49 (FIG. 3) and along a transverse axis 52. An injection device communication input connector 44 and the injection device combination power and communication output connector 46 are positioned at opposite sides of the solid T section 48 on the longitudinal axis 49. A flexible cord section 50 extends from the solid T-section 48 along the transverse axis 52 to an injection device power input connector 42. The injection device communication input connector 44 is configured in the same manner as the front end connector 32 of the heater module 12 so that the power injection device 14 can be connected conveniently and effectively to the back end connector 34 of the heater module 12 as illustrated in FIGS. 1 and 2. The injection device combination power and communication output connector 46 is configured in the same manner as the back end connector 34 of the heater module 12 so that the power injection device 14 can be connected conveniently and effectively to the front end connector 32 of the heater module 12 as illustrated in FIGS. 1 and 2. The injection device power input connector 42 can be configured in any manner as needed for connection to an external high voltage power source. For example, the injection device power input connector 42 could be a conventional NEMA (National Electrical Manufacturers Association) plug for mating with a conventional NEMA receptacle R (FIG. 3) for whatever AC or DC power source is being used for powering the heater modules 12, e.g., 120 volt AC power, 220 volt AC power, 30 volt DC power, or any other power source. Referring now primarily to the schematic diagrams of FIGS. 4, 5, and 6 with secondary reference to FIGS. 1 and 2, an example five heater modules 12 are shown in FIG. 4 connected together in daisy chain fashion as described above. Further, the schematic diagram in FIG. 4 shows the heater modules 12 configured for what is termed "in-line" daisy chain connections in this description and as shown in FIGS. 1 and 2. The "in-line" configuration in this context refers to the connecting wires 26, 22, and 24 of each heater module 12 being electrically and physically in line with each other between the front end connector 32, through the controller device 20, out of the controller device 20 and through the heater 30, and out of the heater device 30 to the back end connector 34, as illustrated in FIGS. 1, 2, and 3.

In the example in-line configuration of the heater modules 12 in FIGS. 1-3, a first power injection device 14 is shown connected to the first heater module 12 to provide high voltage power to the first, second, third, and fourth heater modules 12. A second power injection device is shown connected into the daisy chain between the fourth heater module 12 and the fifth heater module 12 to provide high voltage AC power to the fifth heater module 12 (and to succeeding heater modules, not shown, after the fifth heater module 12). A data processing device D is also shown connected through the first power injection device 14 to the first heater module 12 to receive data communications from, or provide data to, one or more of the heater modules 12. FIG. 5 is an enlarged view of one of the heater modules 12 and is representative of all of the heater modules 12 in this example, so details shown in the FIG. 5 heater module 12 are also applicable to the other heater modules 12 in FIG. 4. FIG. 6 is an enlarged view of one of the power injection devices 14 and is representative of all of the power injection devices 14 in this example, so details shown in the FIG. 6 power injection device 14 are also applicable to the other power injection devices 14 in FIG. 4.

As mentioned above, each heater module 12 has a heater 30 that includes a heater element 60, which creates heat when connected to the high voltage power. In the example heater modules 12 illustrated in FIGS. 4 and 5, two temperature sensors, e.g., a first temperature sensor 62 and a second temperature sensor 64, are positioned in the heater 30 adjacent to the heater element 60 so that they can sense accurate temperatures at the heater element 60. While the example heater 30 illustrated in FIGS. 4 and 5 is shown with two temperature sensors, some heater systems (not shown) may have only one temperature sensor or even three or more temperature sensors. Each heater module 12 also has a controller device 20 for desired functions, for example, but not for limitation, controlling process temperature, monitoring the temperature for over heating or under heating, creating status and report signals, and other functions. In the example controller device 20 illustrated in FIGS. 4 and 5, one of the temperature sensors in the heater 30, e.g., the first temperature sensor 62, provides signals indicative of the heater 30 temperature for use by the controller device 20 in monitoring and controlling process heat temperatures provided by the heater 30, while another one of the temperature sensors in the heater, e.g., the second temperature sensor 64, provides signals indicative of the heater temperature for use by the controller device 20 in high temperature limit monitoring, control, and shut-down functions. The signals from either or both of the temperature sensors 62, 64 can also be used by the controller device for other functions. It may be preferred, but not essential, that the controller device 20 not be mounted directly on the heater 30 in order to not expose the controller device 20 to high temperatures that may be created in the heater 30. Therefore, the controller device 20 shown in the example heater module 12 is connected to the heater 30 by a primary heater cord 22, which also contains conductors that extend between the controller device 20 and the heater 30, as will be described below. The primary heater cord 22 provides whatever electrical wires or connections are needed between the temperature sensor or sensors 62, 64 in the heater 30 and the controller device 20. A secondary heater cord 24 is provided with high voltage conductors and communication conductors for daisy chain connections of the heater module 12 to other heater modules 12 as explained above. As also explained above, back end connectors 34 provided on the secondary heater cords 24 are configured for mating connection to front end connectors 32 on the front end cords 26 (or directly on the controller device 20 if no front-end cord 26 is used) for connecting other heater modules 12 in daisy chain fashion to a particular heater module 12.

In the example heater modules 12, a controller device 20 provides control functions as desired or as designed for a particular heater module 12. In one example embodiment, process temperature control circuitry 70 in the controller device 20 may be provided to control high voltage power to the heater element 60 based on temperatures sensed by a temperature sensor, e.g., the first temperature sensor 62, in the heater 30. Also, high limit control circuitry 72 may be provided in the controller device 20 to monitor the temperature in the heater 30 based on temperature sensed by a temperature sensor, e.g., the second temperature sensor 64, in the heater 30 and to shut off the high voltage power to the heater element 60 in the event of the temperature in the heater 30 exceeding a pre-determined high limit temperature. Signal generating circuitry 74 in the controller device 20 may be provided to generate data communications as discussed above. The example controller device 20 is illustrated with a low voltage DC power supply 76 connected to the high voltage power in the controller device 20 for powering electronic components in the process temperature control circuitry 70, high limit control circuitry 72, signal generating circuitry 74, and other electronic components in the heater module 12. Again, the controller device 20 components and functions described above are examples, which are neither essential nor exclusive for the controller device 20. Other components and functions can be provided in the controller device 20 or the components shown can provide other functions in addition to, or instead of, the functions described above, as would be understood by persons skilled in the art. Such controller device components and functions are not essential to this invention, but the heater apparatus of this invention is provided to accommodate whatever components and functions a particular heater module 12 may have.

Referring now primarily to schematic circuit diagrams in FIGS. 4 and 5, the front end connector 32 has a primary high voltage power terminal 80, a primary neutral terminal 82, a first primary communication terminal 84, and a second primary communication terminal 86. The back end connector 30 has a back end high voltage power terminal 90, a back end neutral terminal 92, a first back end communication terminal 94, and a second back end communication terminal 96. The back end connector 34 is configured in a manner that is capable of mating connection to the front end connector 32 including mating electrical connection of the back end high voltage power terminal 90 to the primary high voltage power terminal 80, mating electrical connection of the back end neutral terminal 92 to the primary neutral terminal 82, mating communication connection of the first back end communication terminal 94 to the first primary communication terminal 84, and mating communication connection of the second back end communication terminal 96 to the second primary communication terminal 86.

The controller device 20 in the example heater module 12 can have a controller housing 130, the optional process temperature control circuitry 70, high limit control circuitry 72, and communication circuitry 74 as explained above. The controller housing 130 also at least partially contains a primary high voltage power conductor 140, a primary neutral conductor 142, a first primary communication conductor 144, and a second primary communication conductor 146, all of which extend from the front end connector 32, through the controller housing 130, and through the primary heater cord 22 to the heater 30. A secondary high voltage power conductor 150, a secondary neutral conductor 152, a first secondary communication conductor 154, and a second secondary communication conductor 156 all extend from the heater 30 through the secondary heater cord 24 to the back end connector 34. For continuity of the high voltage power conductors, neutral conductors, first communication conductors, and second communication conductors from the front end connector 32 to the back end connector 34, connections of the primary conductors to the secondary conductors are made in the heater 30 in the example in-line configured heater module 12 shown in FIGS. 1-5. With those connections, as pertaining to the high voltage power conductors, neutral conductors, first communication conductors, and second communication conductors, the secondary heater cord 24 can be viewed in FIG. 5 as effectively extending from the controller device 20, through the heater 30, to the back end connector 34. In that view, the secondary heater cord 24 is part of the primary heater cord 22 between the controller device 20 and the heater 30 and is part of the heater 30 where the high voltage power, neutral, and low voltage data communications conductors extend through the heater. However, the continuity connections or conductor runs could be made in other ways or at other locations in the heater module 12, some examples of which will be described below.

In the example in-line configured heater module 12 shown generally in FIG. 4 and in more detail in FIG. 5, the primary high voltage power conductor 140 (FIG. 5) extends from the primary high voltage power terminal 80, through the controller housing 130 and through the primary heater cord 22 to the heater 30 where the primary high voltage power conductor 140 is connected electrically to the secondary high voltage power conductor 150, which extends through the secondary heater cord 24 to the back end high voltage power terminal 92. The primary neutral conductor 142 extends from the primary neutral terminal 82, through the controller housing 130 and through the primary heater cord 22, to the heater 30 where the primary neutral conductor 142 is connected electrically to the heater element 60 and to a secondary neutral conductor 152 which extends through the secondary heater cord 24 to the back end neutral terminal 92. The first primary communication conductor 144 extends from the first primary communication terminal 84, through the controller housing 130 and through the primary heater cord 22, to the heater 30 where the first primary communication conductor 144 is connected to a first secondary communication conductor 154 which extends through the secondary heater cord 24 to the first back end communication terminal 94. The second primary communication conductor 146 extends from the second primary communication terminal 86, through the controller housing 130 and through the primary heater cord 22, to the heater 30 where the second primary communication conductor 146 is connected to a second secondary communication conductor 156 which extends through the secondary heater cord 24 to the second back end communication terminal 96.

A pair of first temperature signal conductors 158, 160 is shown in FIG. 5 extending from the example process temperature control circuitry 70, through the primary heater cord 22, and into the heater 30, where the first temperature signal conductors 158, 160 are connected electrically to the first temperature sensor 62 in the heater 30. Therefore, the process temperature control circuitry 70 receives signals indicative of temperature sensed by the first temperature sensor 62 through the first temperature signal conductors 158, 160, which the process temperature control circuitry 70 utilizes to control the temperature of the heater 30 by controlling the high voltage power to the heater element 60. A controlled high voltage power conductor 162 extends from the process temperature control circuitry 70 in the controller housing 130, through the primary heater cord 22, and into the heater 30 where the controlled high voltage power conductor 162 is connected electrically to the heater element 60. The example process temperature control circuitry 70 connects and disconnects the controlled high voltage power conductor 162 to the primary high voltage power conductor 140 to control heat production by the heating element 60 in response to temperature sensed by the first temperature sensor 62.

As mentioned above, the example high limit control circuitry 72 in FIGS. 4 and 5 can be provided to monitor temperature sensed by a temperature sensor, e.g., the second temperature sensor 64, in the heater 30, and, if an excess temperature is sensed, the high limit control circuitry 72 shuts off the high voltage power to the heater element 60. A pair of second temperature signal conductors 164, 166 extends from the high limit control circuitry 72 in the controller housing 130, through the primary heater cord 32, and into the heater 30. The example second temperature signal conductors 164, 166 are connected electrically to the second temperature sensor 64 in the heater 30 and to the high limit control circuitry 72. The example high limit control circuitry 72 is positioned electrically in a manner that enables the high limit control circuitry 72 to disconnect the controlled high voltage power conductor 162 from the primary high voltage power conductor 140 in response to a temperature sensed by the second temperature sensor 64 that exceeds a high-temperature limit.

As shown in the schematic circuit diagrams in FIGS. 4 and 6, the power injection device 14 has an injection device power input connector 42 that includes an injection device high voltage input terminal 100 and an injection device neutral input terminal 102. The injection device communication input connector 44 has a first injection device communication input terminal 104 and a second injection device communication input terminal 106. The injection device communication input connector 44 is configured in a manner that is capable of mating connection to the back end connector 34 including mating communication connection of the first injection device communication input terminal 104 to the first back end communication terminal 94 and mating communication connection of the second injection device communication input terminal 106 to the first back end communication terminal 96. The configuration of the injection device communication input connector 44 accommodates mating connection with the back end high voltage power terminal 90 and the back end neutral terminal 92 in the back end connector 34, for example, by providing a first injection device blank input terminal 108 and a second injection device blank input terminal 109 for mating connection with the back end high voltage power terminal 90 and back end neutral terminal 92, respectively, in the back end connector 34. The injection device combination power and communication output connector 46, includes an injection device high voltage power output terminal 110, an injection device neutral output terminal 112, a first injection device communication output terminal 114, and a second injection device communication output terminal 116. The injection device combination power and communication output connector 46 is configured in a manner that is capable of mating connection to the front end connector 32 including mating electrical connection of the injection device high voltage power output terminal 110 to the primary high voltage power terminal 80, mating electrical connection of the injection device neutral output terminal 112 to the primary neutral terminal 82, mating communication connection of the first injection device communication output terminal 114 to the first primary communication terminal 84, and mating communication connection of the second injection device communication output terminal 116 to the first primary communication terminal 86.

In the power injection device 14, an injection device high voltage power conductor 120 is connected electrically to the injection device high voltage power input terminal 100 and to the injection device high voltage power output terminal 110, an injection device neutral conductor 122 is connected electrically to the injection device neutral input terminal 102 and to the injection device neutral output terminal 112, a first injection device communication conductor 124 is connected to the first injection device communication input terminal 104 and to the first injection device communication output terminal 114, and a second injection device communication conductor 126 is connected to the second injection device communication input terminal 106 and to the second injection device communication output terminal 116. The first injection device blank input terminal 108 and the second injection device blank input terminal 109 in the injection device communication input connector 44 are not connected electrically to any other components in the power injection device 14. Therefore, there is no electrical connection of the first injection device blank input terminal 108 to the injection device high voltage power output terminal 110, and there is no electrical connection of the second injection device blank input terminal 109 to the injection device neutral output terminal 112. Consequently, connection of the back end connector 34 of the secondary heater cord 24 to the injection device communication input connector 44 provides electrical continuity between the first and second secondary communications conductors 154, 156 of the secondary heater cord 24 and the first and second primary communication conductors 144, 146, respectively. However, connection of the back end connector 34 of the secondary heater cord 24 to the injection device communication input connector 44 effectively terminates the secondary high-voltage power conductor 150 and the secondary neutral conductor 152 of the secondary heater cord 24.

As mentioned above, an auxiliary communication cord 28 can be used to conduct data communications out of and into the heater module 12. As illustrated in FIGS. 1 and 4, the data communications can be conducted into the heater module 12 through the power injection device 14 that is connected to the first heater module 12 in the daisy chain. The auxiliary communication cord 28 has an auxiliary communication output connector 170 on one end of the auxiliary communication cord 28 (see FIG. 4), which includes a first auxiliary communication output terminal 174 and a second auxiliary communication output terminal 176. The auxiliary communication output connector 170 is configured in a manner that is capable of mating connection to the injection device communication input connector 44, including mating communication connection of the first auxiliary communication output terminal 174 to the first injection device communication input terminal 104 and mating communication connection of the second auxiliary communication output terminal 176 to the second injection device communication input terminal 106.

The data communication conductors 154, 156 and 144, 146 in the example heater module 12 are electric conductors, usually low voltage wires. However, other kinds of data communications conductors could be used, for example, fiber optic data communication conductors. Also, for electric data communications, the pair of two low voltage data communications conductors, e.g., 154, 156 and 144, 146, is provided in the example heater modules 12. However, any number of data communication conductors can be provided as needed or desired for particular applications.

An optional extension cord 178 is also shown in FIG. 4, which includes an extension high voltage conductor, an extension neutral conductor 182, a first communication conductor 184, and a second communication conductor 186. Extension cord 178 includes suitable extension input and output connectors 188, 190 to connect with the front end connectors 32 and the back end connectors 34, respectively, of the heater modules 12 according to the explanations above.

As mentioned above, heater apparatus, for example, the example heater apparatus 10 shown in FIGS. 1-6, are sometimes used to heat pipes, vessels, or other equipment in environments that can damage or interfere with proper functioning of electronic circuits, components, conductors, or contacts in the heater modules 12. For example, it is not uncommon for facilities and spaces in which such heater apparatus 10 are used to be sprayed and washed down with water, steam, or other cleansers, in which case the electronic circuits, components, conductors, or contacts in the heater modules may be soaked with water or moisture in the environment from the spray or steam may leak or seep into connectors as well as into seams or openings in the housing 130 of the controller device 20. Such moisture can also damage electronic components or circuits in the controller 20 or damage conductors, contacts, or terminals in the front end connectors 32 or in the back end connectors 34. Damage to the electronic components or circuits in the controller 20 or damage conductors, contacts, or terminals in the front end connectors 32 or in the back end connectors 34 can also occur from other environmental conditions, including reactive or corrosive chemicals, dust, or ultraviolet (UV) radiation, heat, or cold. Magnetic fields, for example magnetic fields produced by plasma generators or by magnetically levitated turbo pumps can interfere or even damage the electronic circuits or components in the controller device 20. Also, for example, radio frequency (RF) or microwave electromagnetic radiation in the environment or vicinity of the heater apparatus 10 can interfere with the functioning and reliability of the electronic components or circuits in the controller 20

The configuration of the example heater apparatus 10 in FIGS. 1-6 described above is particularly conducive to being provided as a water-resistant heater assembly, in which each heater module 12 of the heater apparatus 10 has only two connectors, e.g., the front end connector 32 and the back end connector 34 (sometimes called the input connector 32 and output connector 34), and no other connectors or exposed conductors or terminals facilitates providing protective features to prevent or minimize likelihood of water leakage and moisture incursion. For example, the heater apparatus 10 can be provided as a water-resistant heater assembly by, using watertight electrical connectors that provide water tight seals for the front end connectors 32 and back end connectors 34 and by providing water resistant controller devices 20 as will be described in more detail below in relation to FIGS. 7-9.

Water tight electrical connectors suitable for use as the front end connectors 32 and the back end connectors 34 shown in FIGS. 1-3 are well-known and available commercially, so it is not necessary to show or describe them in detail for an understanding of this invention. Suffice it to say that at least some of such commercially available watertight electrical connectors are provided with O-ring seals or other kinds of seals that prevent leakage or incursion of moisture when they are connected together, so that water or moisture in the environment of the connectors cannot reach the electrical conductors, contacts, or terminals inside the connectors. Suitable watertight electrical connectors that provide a water tight seal that prevents water leakage or incursion of moisture are made, for example, by Elektron Technology, plc, of Cambridge, UK, and are marketed and distributed worldwide under the Bulgin™ and Buccaneer™ trademarks. Therefore, water tight electrical connectors per se are not a feature of this invention, but the configuration of the heater modules 12 that provide the full functionalities and daisy chain connectivity described above with only two connectors in each heater module 12, e.g., the front end connector 32 and the back end connector 34, minimizes the number of watertight connectors needed, thus minimizes the cost of making the example heater apparatus 10 watertight and minimizes the chances of having a faulty watertight connector or a faulty installation or application of a watertight connector. The power injection devices 14 can also be provided with such watertight connectors for at least the injection device communication input connector 44 and the injection device combination power and communication output connector 46 to mate with the watertight front end connectors 32 and back end connectors 34 of the heater modules 12, thereby maintaining the watertight electrical connections of the heater modules 12 even where the occasional power injection devices 14 are needed (for example, after eight to twenty heater modules 12 in a daisy chain, depending on the size and current draw of the heater elements 60 in the heaters 30 as explained above). Of course, the injection device power input connectors 42 of the power injection devices 14 can also be provided with watertight connectors if desired.

For further protection against water leakage or moisture incursion, chemical degradation or corrosion, magnetic interference, RF interference, UV radiation, extreme heat or cold, shock or impact, dust, or other environmental hazards or conditions, the heater modules 12 can be provided with controller devices 20 outfitted with appropriate example protective shields 210 as illustrated in FIGS. 7-9 to protect against those environmental conditions, interferences, hazards, or exposures. As shown in FIGS. 7-9, the example controller device 20 has a controller housing 130 with an outside wall 190 that is shaped substantially as a figure of revolution about a longitudinal axis 192. The term figure of revolution is a common geometric term for a figure that is obtained by rotating a plane figure about an axis, sometimes also called solid of revolution, although the controller housing 130 with its outside wall 190 is hollow with an interior controller chamber 204 inside as best seen in FIG. 9.

For the controller housing 130 of the example controller device shown in FIGS. 7-9, the figure of revolution shape includes an elongated cylinder shape that gradually converges toward the longitudinal axis 192 at both the housing front end 194 and the housing back end 198. The housing front end 194 is shaped substantially as a figure of revolution (e.g., cylindrical) that defines a front aperture 196. Similarly, the housing back end 198 is shaped substantially as a figure of revolution (e.g., cylindrical) that defines a back aperture 200. The front aperture 196 in the housing 130 accommodates the front end cord 26 extending through the front aperture 196 to the controller circuit board 206 in the interior controller chamber 204, which is enclosed by the housing 130. The back aperture 200 in the housing 130 accommodates the primary heater cord 22 extending through the back aperture 200 from the controller circuit board 206 in the interior controller chamber 204. In one example embodiment illustrated in FIGS. 7-9, the housing 130 is formed in two halves, one of which is visible in the cross-section view of FIG. 9, that are held together by fasteners (e.g., screws) 108.

A protective shield 210 is shown in FIGS. 7-9 fitted tightly around the external surface 202 of the controller housing 130. In one example embodiment, the protective shield 210 is made with heat shrink material, for example a heat shrink tube or heat-shrinkable sleeve that when heated and shrunk is impervious to water. The heat-shrunk tube or sleeve (i.e., a heat shrink sleeve that has been heated and shrunk) covers the entire outside surface 202, including over the joint between the two halves of the housing 130 and over the fasteners 108 with the heat-shrunk material, which makes the outside wall 190 of the housing 130 water tight. The shape of the housing 130 substantially as a figure of revolution facilitates the use of a heat shrink tube or heat shrinkable sleeve to form the protective shield 210. For example, the controller housing 130 shaped as a figure of revolution is insertable into a heat-shrink tube or sleeve without snagging, piercing, or tearing the heat-shrink tube or sleeve, and then the heat shrink tube or sleeve is heated to shrink and contract it tightly onto the entire exterior surface 202 of the outside wall 190 of the controller housing 130. Such heat shrink tubes or sleeves are available with a layer of thermoplastic adhesive on the inside, which enhances the resistance to incursion of moisture and other foreign or environmental elements. Suitable heat shrink tubes and heat shrinkable sleeves that are impervious to water are readily available from a variety of manufacturers and commercial suppliers. For example, but not for limitation, a clear, heat shrink material available from Heat Shrink Supply, Southlake, Tex. (e.g., part no. GSHS-4635WT-2-C) is suitable for the protective shield 210

In this regard, the cylindrical shape of the example controller housing 130 shown in FIGS. 7-9 has a circular cross-section. However, the shape does not have to have a perfectly circular cross-section to facilitate use of a heat-shrinkable sleeve to form the protective shield 210. Some flat surface areas (not shown) on the external surface 202 of the housing 130 may not inhibit mounting and use of a heat-shrinkable sleeve to form the protective shield 210 as long as the flat surfaces are not so large as to create sharp external angles in the exterior surface 202. A modified cylindrical shape that has a cross-section in the shape of, for example, an icosagon (twenty sides), i.e., an icosahedron, a hexadecagon (sixteen sides), i.e., a hexakaidecahedron, a dodecagon (twelve sides), i.e., a dodecahedron, a decagon (ten sides), i.e., a decahedron, an octagon (eight sides), i.e., an octahedron, or even a hexagon (six sides), i.e., a hexahedron, would work. A hexahedron has external angles of 240 degrees where the flat surfaces meet. An octagon has external angles of 225 degrees. The more sides a polygon shape has, the smaller the external angles where the sides meet. For purposes of this description, the term "shaped substantially as a figure of revolution" means a three-dimensional figure that does not have an external angle greater than 240 degrees in its cross-section shape. In this regard, a variety of shapes including the modified cylindrical shapes described above as well as cylindrical, conical, and other curvilinear shapes with circular, elliptical, parabolic, or hyperbolic cross-sections, prisms, pyramids, spheres, and other shapes could meet those criteria.

A heat-shrunk front boot 220 made with a heat shrink tube that is impermeable to water is provided to surround the housing front end 194 and adjacent portion of the front end cord 26 to seal the front aperture 196 around the periphery of the front end cord 26 for further water tightness. As shown in FIG. 9, the heat shrunk front boot 220 surrounds and seals over the protective shield 210 at the housing front end 194. Similarly, a water-impermeable heat-shrunk back boot 226 is provided to surround the housing back end 198 and adjacent portion of the primary heater cord 22 to seal the back aperture 200 around the periphery of the primary heater cord 22 for further water tightness. As shown in FIG. 9, the heat shrunk back boot 226 surrounds and seals over the protective shield 210 at the housing back end 198. Water-impermeable heat shrink tubes suitable for the front boot 220 and back boot 226 are readily available from a variety of manufacturers and commercial suppliers. For example, but not for limitation, a clear, heat shrink material available from Mcmaster-Carr Supply Company, Elmhurst, Ill. (e.g., part no. 6855K15 or 7270K2) is suitable for the heat-shrunk front boot 220 and for the heat-shrunk back boot 226.

In addition to being impermeable to water, the protective shield 210 can be transparent or translucent, i.e., transmits at least some visible light, so that visible light emitted by one or more light emitting devices, e.g., light emitting diode (LED) 212 (FIG. 9), which is transmitted through a transparent or translucent window 214 (shown in phantom lines in FIG. 7) in the controller housing 130 is also visible through the protective shield 210. Again, suitable heat shrink tubes or sleeves with these characteristics, e.g., impermeable to water and light transmissive, are readily available from a variety of manufacturers, including Heat Shrink Supply, Southlake, Tex. (e.g., part no. GSHS-4635WT-2-C).

The housing 130 of the controller device 20 shaped substantially as a figure of revolution as described above also facilitates application of protective shields 210 that are adapted for other purposes, e.g., for prohibiting or minimizing the adverse effects of chemical degradation or corrosion, magnetic interference, RF interference, UV radiation, extreme heat or cold, shock or impact, dust, or other environmental hazards or conditions. Heat-shrinkable tube or sleeve materials with characteristics that are effective for preventing or minimizing adverse effects of some of those environmental conditions are available commercially, for example, chemically inert heat-shrinkable material, UV absorbing or reflective heat-shrinkable material, or dust-proof material. Suitable chemically inert heat shrink tubing materials can include PTFE (polytetrafluoroethylene) or PTFE/FET (Fluorinated ethylene propylene) manufactured by, for example, Zeus Industrial Products, Inc., of Orangeburg, S.C. UV absorbent heat shrink tubing materials can include, for example, a dark colored heat shrink material, a thick wall heat shrink material, or a high performance heat shrink material, for example, the Crystal Clear brand heat shrink material manufactured by InsulTab, Inc., of Woburn, Mass. Dust-proof heat shrink tubing materials are available from any of the sources mentioned above.

The controller device 20 shaped substantially as a figure of revolution is beneficial for preventing or minimizing interferences from magnetic fields and RF electromagnetic radiation. For example, a magnetic shielding material is a magnetic material that re-directs a magnetic field around or away from the item or components being shielded, e.g., the electronic components and circuits in the controller device 20. EMI shielding, heat shrink tube materials are available commercially, for example, the "Shrink-N-Shield" brand manufactured and sold by The Zippertubing Company of Chandler, Ariz. However, for shielding in more extreme magnetic and electromagnetic fields, magnetic or EMI shielding materials are available in sheets that can be wrapped or applied to the external surface 202 of a controller device 20 shaped substantially as a figure of revolution. RF shielding materials and thermal insulation materials are also available in sheet or ribbon forms that can be wrapped or applied conveniently on the controller housing 130 shaped substantially as a figure of revolution. The term "thermal insulation" in this context means having a coefficient of heat transfer that is less than the coefficient of heat transfer of the housing 130. Thermal insulation materials available in silicone foam, metallic foil, fiberglass, silicate, ceramic, and other heat insulation materials maybe used to provide any required thermal insulation. Also, for example, the controller housing 130 shaped substantially as a figure of revolution, when covered with a cushion material, is more immune to shock or impact damage than a shape with sharp angles or corners. Any of the shielding functions discussed above can also be provided by a mechanically attachable shell or enclosure (not shown) that is molded or otherwise formed to fit neatly over the outside surface of the controller housing 130 and made with a material that provides the desired shielding effect, e.g., moisture, chemical, dust, EMI, magnetic, thermal, or other environmental conditions.

Figure 10:
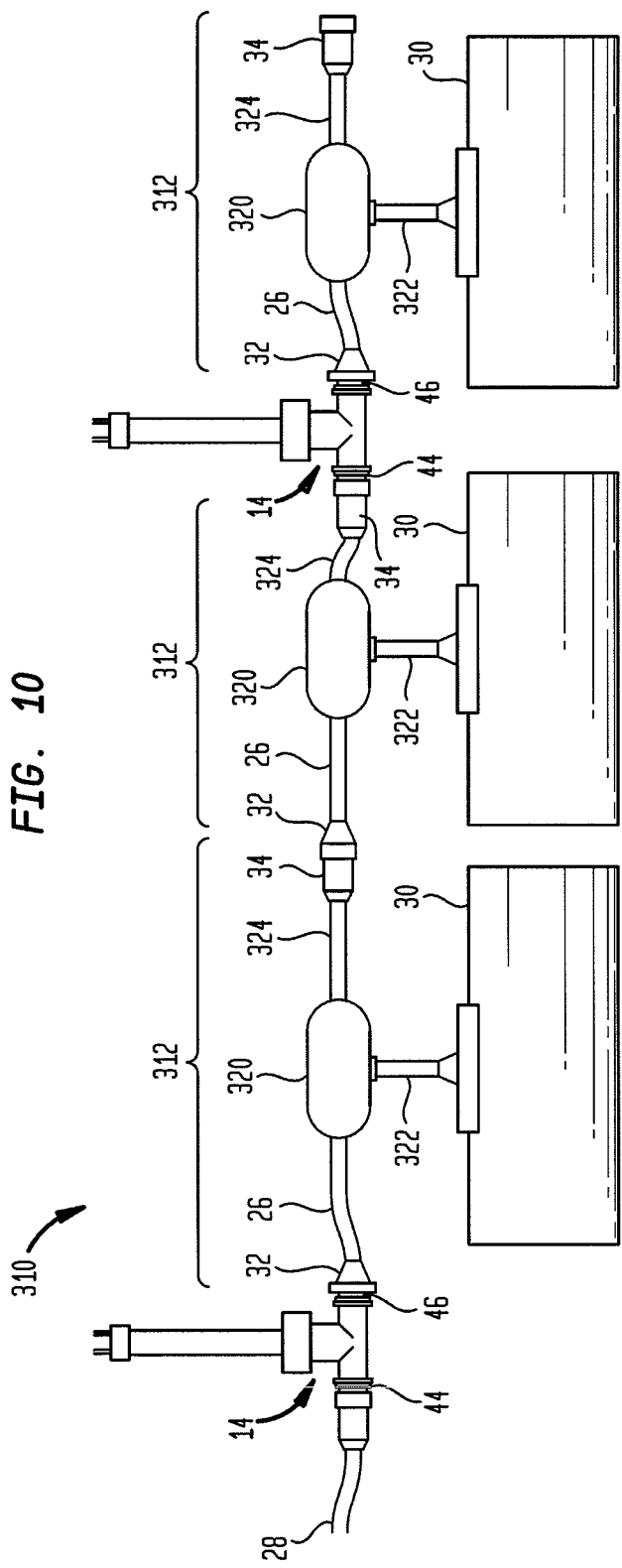
FIG. 10 is a side elevation view of another example pipe heater assembly comprising several heater modules and power injection devices in a T-type connection configuration.
Figure 11:
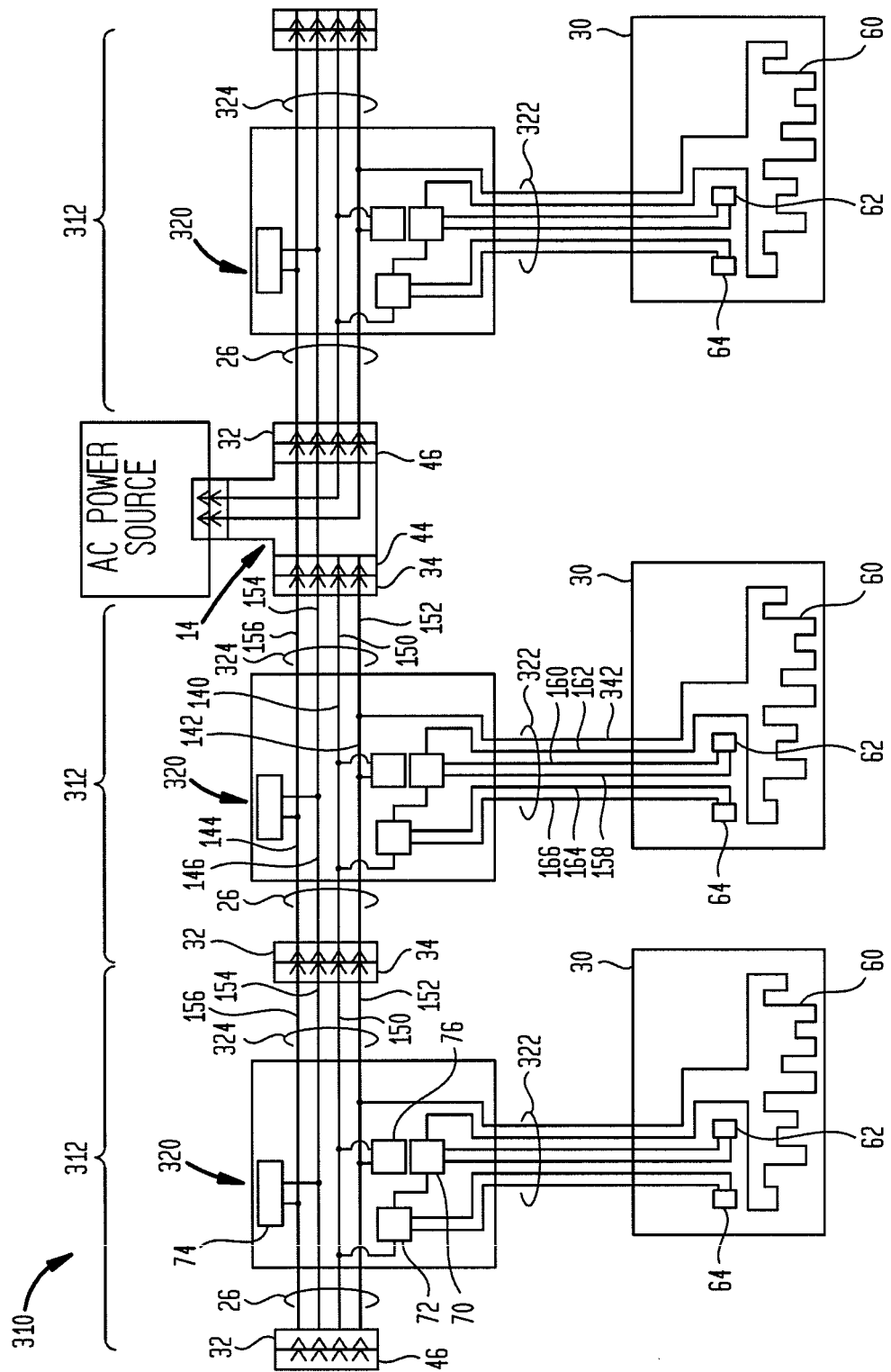
FIG. 11 is a schematic diagram of several example heater modules assembled together in the T-type daisy chain connected fashion shown in FIG. 10 with an example power injection device connected between two intermediate heater modules.

Another example pipe heater assembly 310 comprising several representative heater modules 312 with a T-type configuration are shown in FIGS. 10 and 11 connected together in daisy chain fashion along with power injection devices 14. The schematic circuit diagram in FIG. 11 shows the cords and conductors in the example T-type configuration of FIG. 10. Essentially, the heater 30 with the heater element 60, and temperature sensors 62, 64 in each T-type configured heater element 312 is substantially the same as the heaters 60 in the in-line configuration described above and shown in FIGS. 1-9. Also, the electronic components in the T-type configured controller devices 320 in the heater modules 312 are substantially the same as the electronic components in the in-line configured heater modules 12 described above, e.g., the process temperature circuitry 70, high limit control circuitry 72, and communication circuitry 74, and the low voltage DC power supply 76, and those components are all connected electrically in the same manner and function as described above. Also, the front end connectors 32 and the back end connectors 34 are also the same as described above. Likewise, the power injection device 14 and its connectors 44, 46 are the same as described above. The in-line conductors of this T-type configuration, i.e., the primary high voltage power conductor 140, primary neutral conductor 142, first primary communication conductor 144, second primary communication conductor 146, secondary high-voltage power conductor 150, secondary neutral conductor 152, first secondary communication conductor 154, and second secondary communication conductor 156 are all substantially the same as those conductors in the in-line heater modules 12 described above. Therefore, further description of those components and conductors in the T-type configured heater modules 312 is not necessary for an understanding of this example embodiment.

In this T-type configured heater module 312, the front end cord 26 is the same as the front end cord 26 of the in-line configured heater module 12 described above, but the high voltage power and data communications between adjacent controller devices 320 are routed directly from the controller device 320 through a back end cord 324 to the back end connector 34 instead of through the heater 30. Therefore, the secondary high-voltage power conductor 150, secondary neutral conductor 152, first secondary communication conductor 154, and second secondary communication conductor 156 are contained in the back end cord 324. A branch primary neutral conductor 342 and the controlled high voltage power conductor 162 along with the first temperature signal conductors 158, 160, the second temperature signal conductors 164, 166 are routed between the controller device 312 and the heater 30 through a branch primary heater cord 322. The power injection device 14 is connected and used in between these T-type configured heater modules 312 in the same manner as described above for the in-line configured heater modules 12. As described above for the in-line heater modules 12, each of these T-type configured heater modules 312 has only the two connectors, i.e., the front end connector 32 and the back end connector 34.

Figure 12:
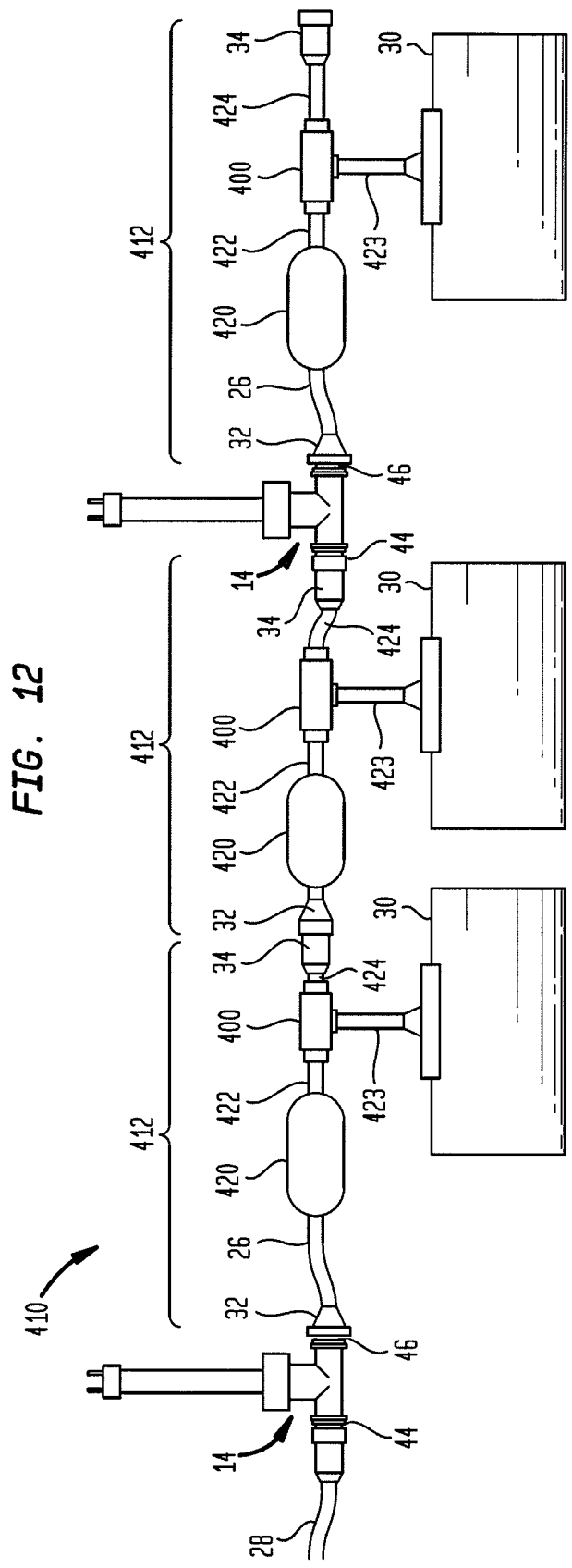
FIG. 12 is a side elevation view of another example pipe heater assembly comprising several heater modules and power injection devices in a hybrid in-line/T-type connection configuration.
Figure 13:
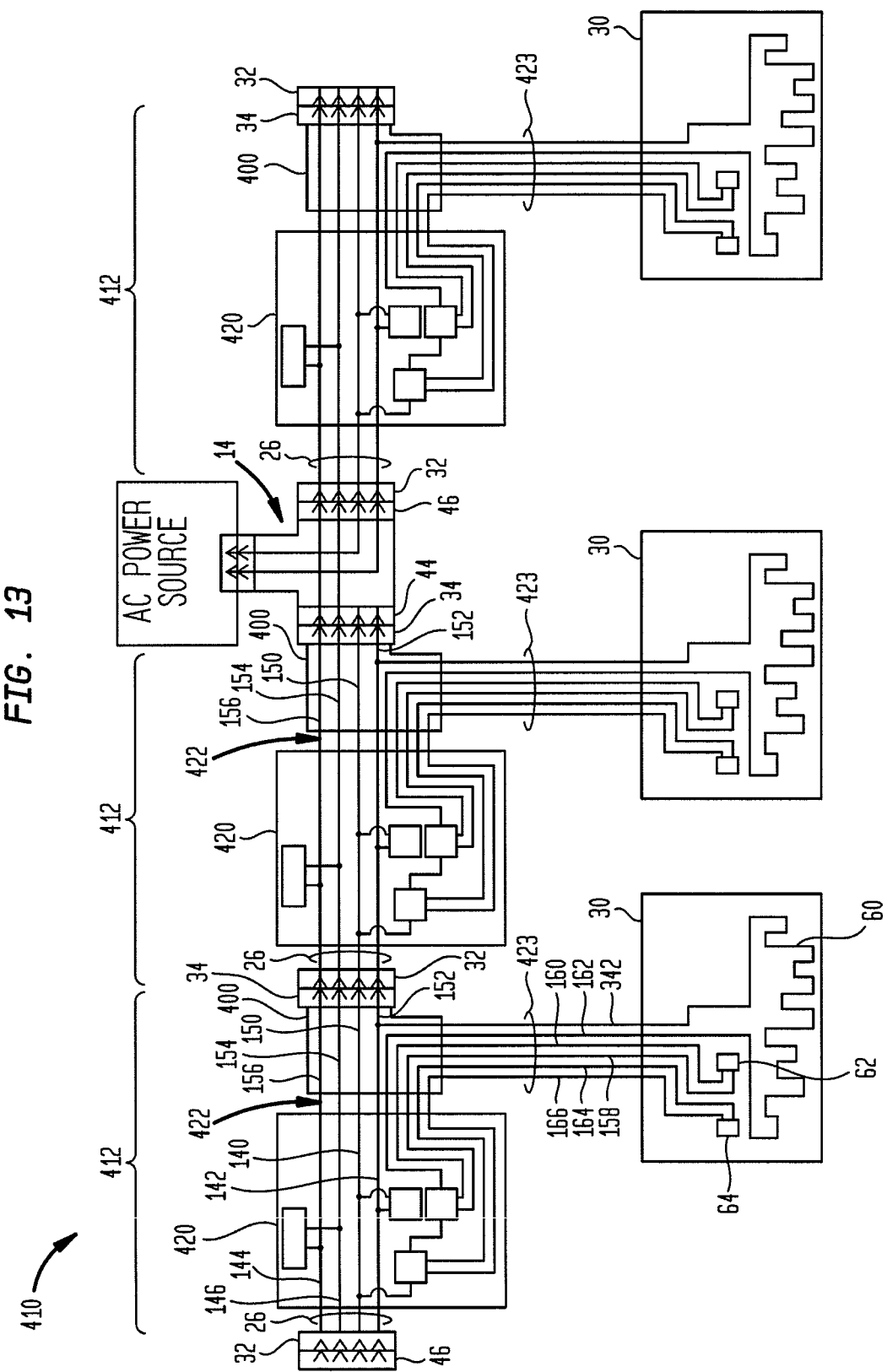
FIG. 13 is a schematic diagram of several example heater modules assembled together in the hybrid in-line/T-type daisy chain connected fashion shown in FIG. 12 with an example power injection device connected between two intermediate heater modules.

Another example pipe heater assembly 410 comprising several representative heater modules 412 with a T-type configuration are shown in FIGS. 12 and 13 connected together in daisy chain fashion along with power injection devices 14. The schematic circuit diagram in FIG. 13 shows the cords and conductors in the example T-type configuration of FIG. 12. The heater modules 412 are much the same as the heater modules 312 described above, except that the T-type configuration in the heater module 412 is provided by a T-junction device 400 instead of directly from the controller device 420. The in-line conductors of this T-type configuration, i.e., the primary high voltage power conductor 140, primary neutral conductor 142, first primary communication conductor 144, second primary communication conductor 146, secondary high-voltage power conductor 150, secondary neutral conductor 152, first secondary communication conductor 154, and second secondary communication conductor 156 are all substantially the same as those conductors in the heater modules 312 described above. However, instead of the secondary high-voltage power conductor 150, secondary neutral conductor 152, first secondary communication conductor 154, and second secondary communication conductor 156 are routed to the back end connector 34 through the T-type junction device 400. The branch primary neutral conductor 342 and the controlled high voltage power conductor 162 along with the first temperature signal conductors 158, 160, the second temperature signal conductors 164, 166 are routed between the controller device 412 and the heater 30 through the T-junction device and then through a branch primary heater cord 422. The branch primary heater cord 422 extends between the T-junction device 400 and the heater 30. The power injection device 14 is connected and used in between these T-type configured heater modules 412 in the same manner as described above for the in-line configured heater modules 12. The rest of the connectors, components, and functions of the controller device 420 and the heater 30 in the T-type configured heater modules 412 are substantially the same as described above for the in-line configured heater modules 12. Therefore, further explanation is not necessary for a person skilled in the art to understand the structure and functions of this T-type heater module 412. As described above for the in-line heater modules 12, each of these T-type configured heater modules 312 has only the two connectors, i.e., the front end connector 32 and the back end connector 34.

Figure 14:
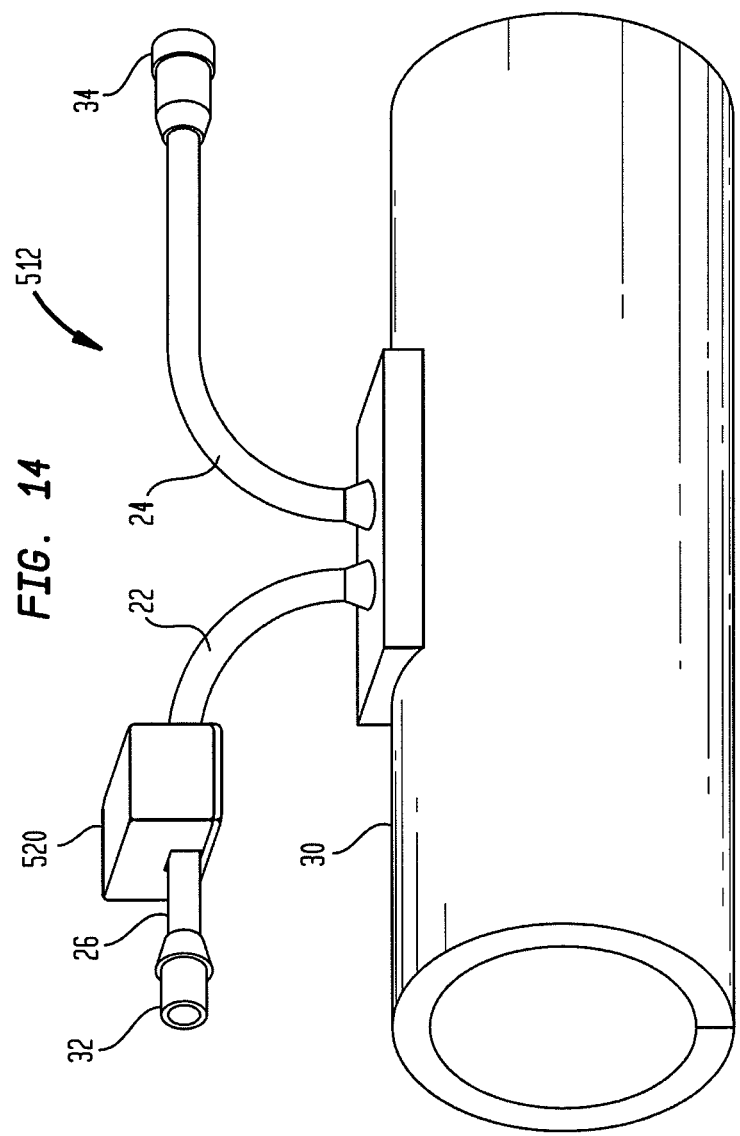
FIG. 14 is an isometric view of a heater module outfitted with another example controller device.

Another example in-line configured heater module 512 is illustrated in FIG. 14 with another example controller device 520. The controller device 520 has a rectangular shape. The two connectors, front end connector 32 and back end connector 34 are the same as described above as for the in-line configured heater modules 12.

The foregoing description provides examples that illustrate the principles of the invention, which is defined by the features that follow. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the features. The words "comprise," "comprises," "comprising," "include," "including," and "includes" when used in this specification, including the features, are intended to specify the presence of stated features, integers, components, or steps, but they do not preclude the presence or addition of one or more other features, integers, components, steps, or groups thereof.

The invention and several embodiments in which an exclusive property or privilege is claimed are defined as follows:

1. Heater apparatus, comprising:
   (i) a heater module comprising:
      a heater;
      a controller device connected to the heater by a primary heater cord, the controller device comprising a front end connector having a primary high voltage power terminal, a primary neutral terminal, and at least a first primary communication terminal;
      a secondary heater cord extending from the controller device to a back end connector that includes a back end neutral terminal, a back end high voltage power terminal, and at least a first back end communication terminal, the back end connector being configured in a manner that is capable of mating connection to the front end connector including mating electrical connection of the back end high voltage power terminal to the primary high voltage power terminal, mating electrical connection of the hack end neutral terminal to the primary neutral terminal, and mating communication connection of the first back end communication terminal to the first primary communication terminal; and
   (ii) a power injection device comprising:
      an injection device power input connector, including an injection device high voltage input terminal and an injection device neutral input terminal;
      an injection device communication input connector, including at least a first injection device communication input terminal, said injection device communication input connector being configured in a manner that is capable of mating connection to the back end connector including mating communication connection of the first injection device communication input terminal to the first back end communication terminal; and
      an injection device combination power and communication output connector, including an injection device high voltage power output terminal, an injection device neutral output terminal, and at least a first injection device communication output terminal, said injection device combination power and communication output connector being configured in a manner that is capable of mating connection to the front end connector including mating electrical connection of the injection device high voltage power output terminal to the primary high voltage power terminal, mating electrical connection of the injection device neutral output terminal to the primary neutral terminal, and mating communication connection of the first injection device communication output terminal to the first primary communication terminal.

2. The heater apparatus of claim 1, wherein the secondary heater cord extends from the controller device and through the heater to the back end connector.

3. The heater apparatus of claim 1, wherein the secondary heater cord extends directly from the controller device to the back end connector.

4. The heater apparatus of claim 1, wherein the secondary heater cord extends from the controller device through a T-junction device to the back end connector.

5. The heater apparatus of claim 1, wherein the power injection device includes:
   (i) an injection device high voltage power conductor connected electrically to the injection device high voltage power input terminal and to the injection device high voltage power output terminal;
   (ii) an injection device neutral conductor connected electrically to the injection device neutral input terminal and to the injection device neutral output terminal; and
   (iii) at least a first injection device communication conductor connected to the first injection device communication input terminal and to the first injection device communication output terminal.

6. The heater apparatus of claim 1, wherein the front end connector and the hack end connector are both of a type that provides a water tight seal for the primary high voltage power terminal, the primary neutral terminal, the first primary communication terminal, the back end high voltage power terminal, the back end neutral terminal, and the first back end communication terminal.

7. The heater apparatus of claim 1, wherein the front end connector, the back end connector, the injection device communication input connector, and the injection device combination power and communication output connector are all of a type that provides water tight seals for the back end high voltage power terminal, the back end neutral terminal, the first back end communication terminal, the first injection device communication input terminal, the injection device high voltage power output terminal, the injection device neutral output terminal, the first injection device communication output terminal, the primary high voltage power terminal, the primary neutral terminal, the first primary communication terminal.

8. The heater apparatus of claim 1, wherein the controller device comprises:
   a controller housing with an outside wall which is shaped substantially as a figure of revolution extending along a controller longitudinal axis between a housing front end shaped substantially as a figure of revolution that defines a front aperture and a housing back end shaped substantially as a figure of revolution that defines a back aperture, said controller housing having an external surface and enclosing an interior controller chamber; and
   a protective shield covering the external surface of the controller housing.

9. The heater apparatus of claim 8, wherein the protective shield is a heat-shrunk material.

10. The heater apparatus of claim 9, wherein the protective shield is impermeable to water.

11. The heater apparatus of claim 8, wherein the protective shield is chemically inert.

12. The heater apparatus of claim 8, wherein the protective shield is a magnetic field shielding material.

13. The heater apparatus of claim 8, wherein the protective shield is an RF shielding material.

14. The heater apparatus of claim 8, wherein the protective shield is impervious to dust.

15. The heater apparatus of claim 8, wherein the protective shield reflects or absorbs ultraviolet radiation.

16. The heater apparatus of claim 5, wherein the protective shield is a cushion material.

17. The heater apparatus of claim 8, wherein the protective shield is a thermal insulation material.

18. The heater apparatus of claim 8, wherein the protective shield is a material that transmits visible light.

19. The heater apparatus of claim 8, including:
a front end cord that extends through the front aperture;
a primary heater cord that extends through the back aperture;
a water impermeable front boot that extends over both the front end of the housing, including over a front end portion of the protective shield and over a portion of the front end cord that is external to the housing; and
a water impervious back boot that extends over both the back end of the housing, including a back end portion of the protective shield and a portion of the primary heater cord that is external to the housing.

20. The heater apparatus of claim 19, wherein the front boot and the back boot comprise a heat-Shrunk material.

21. The heater apparatus of claim 1, including a heater element in the heater and including at least one temperature sensor in the heater adjacent to the heater element.

22. The heater apparatus of claim 21, wherein the controller device includes a controller housing that at least partially contains:
(i) a primary neutral conductor that extends from the primary neutral terminal, through the controller housing and through the primary heater cord, to the heater where the primary neutral conductor is connected electrically to the heater element and to a secondary neutral conductor which extends through the secondary heater cord to the back end neutral terminal;
(ii) a primary high voltage power conductor that extends from the primary high voltage power terminal, through the controller housing and through the primary heater cord to the heater where the primary high voltage power conductor is connected electrically to a secondary high voltage power conductor, which extends through the secondary heater cord to the back end high voltage power terminal; and
(iii) at least a first primary communication conductor that extends from the first primary communication terminal, through the controller housing and through the primary heater cord, to the heater where the first primary communication conductor is connected to a first secondary communication conductor which extends through the secondary heater cord to the first back end communication terminal.

23. The heater apparatus of claim 22, wherein the controller housing contains:
(i) control circuitry configured for controlling temperature of the heater based at least in part on temperature sensed by the at least one temperature sensor and for turning high voltage power to the heater element of in response to temperature sensed by the at least one temperature sensor in excess of a high limit temperature parameter; and
(ii) communication circuitry configured for generating communications signals.

24. The heater apparatus of claim 23, including:
(i) temperature signal conductors extending from the temperature control circuitry, through the primary heater cord, and into the heater, said temperature signal conductors being connected electrically to the at least one temperature sensor in the heater and to the temperature control circuitry; and
(ii) a controlled high voltage power conductor extending from the control circuitry in the controller housing, through the primary heater cord, and into the heater where the controlled high voltage power conductor is connected electrically to the heater element, and wherein the control circuitry connects and disconnects the controlled high voltage power conductor to and from the primary high voltage power conductor to control heat production by the heating element in response to temperature sensed by the at least one temperature sensor.

25. The heater apparatus of claim 1, wherein:
the front end connector includes a second primary communication terminal;
the back end connector includes a second back end communication terminal and is configured in a manner that is capable of mating communication connection of the second back end communication terminal to the second primary communication terminal;
the injection device communication input connector includes a second injection device communication input terminal, and the injection device communication input connector is configured in a manner that is capable of mating connection to the back end connector including mating communication connection of the second injection device communication input terminal to the second back end communication terminal; and
the injection device combination power and communication output connector includes a second injection device communication output terminal, and the injection device combination power and communication output connector is configured in a manner that is capable of mating connection to the front end connector including mating communication connection of the second injection device communication output terminal to the second primary communication terminal.

26. The heater apparatus of claim 25, wherein the power injection device includes:
(i) an injection device high voltage power conductor connected electrically to the injection device high voltage power input terminal and to the injection device high voltage power output terminal;
(ii) an injection device neutral conductor connected electrically to the injection device neutral input terminal and to the injection device neutral output terminal;
(iii) a first injection device communication conductor connected to the first injection device communication input terminal and to the first injection device communication output terminal; and
(iv) a second injection device communication conductor connected to the second injection device communication input terminal and to the second injection device communication output terminal.

27. The heater apparatus of claim 26, including an auxiliary communication cord having an auxiliary communication output connector on one end of the auxiliary communication cord, said first auxiliary communication output connector including a first auxiliary communication output terminal and a second auxiliary communication output terminal, said auxiliary communication output connector being configured in a manner that is capable of mating connection to the injection device communication input connector, including mating communication connection of the first auxiliary communication output terminal to the first injection device communication input, terminal and mating communication connection of the second auxiliary communication output terminal to the second injection device communication input terminal.

28. A power injection device for injecting power into fewer than all of a plurality of heater modules in an assembly of heater modules, wherein each of the heater modules has a heater and a controller and is connectable together in a daisy-chain fashion with the other heater modules in the assembly by a secondary heater cord with a hack end connector configured for mating physical and electrical connection to a front end connector of a succeeding heater module in the assembly in a manner that is capable of connecting a secondary high voltage power conductor, a secondary neutral conductor, and at least one secondary communications conductor in the secondary heater cord to a high voltage power conductor, a neutral conductor, and at least one communications conductor in the succeeding heater module the injection device, comprising:

an injection device combination power and communication output connector, that is configured for mating physical and electrical connection to the front end connector in a manner that is capable of electrically connecting an injection device high voltage power output terminal, an injection device neutral output terminal, and at least a first injection device communication output terminal in the injection device combination power and communication output connector, respectively, to the high voltage power conductor, the neutral conductor, and the least one communications conductor in one of the heater modules in the assembly;

an injection device communication input connector that is configured for mating physical and electrical connection to the back end connector in a manner that is capable of electrically connecting a first injection device communication input terminal in the injection device communication input connector to the at least one secondary communications conductor in the secondary heater cord; and an injection device power input connector that has an injection device high voltage power input terminal and an injection device neutral input terminal;

wherein the power injection device does not provide any high voltage power electrical connection between the injection device communication input connector and the injection device combination power and communication output connector, but the power injection device does have: (i) an injection device high voltage power conductor that electrically connects the injection device high voltage power input terminal of the injection device power input connector to the injection device high voltage power output terminal of the injection device combination power and communication output connector; (ii) an injection device neutral conductor that electrically connects the injection device neutral input terminal of the injection device power input connector to the injection device neutral output terminal of the injection device combination power and communication output connector; and (iii) a first injection device communication conductor that electrically connects the first injection device communication input terminal of the injection device communication input connector to the first injection device communication output terminal of the injection device combination power and communication output connector.

29. The power injection device of claim 28, wherein:

the injection device communication input connector is configured for mating physical and electrical connection to the back end connector in a manner that is also capable of electrically connecting a second injection device communication input terminal in the injection device communication input connector to a second secondary communications conductor in the secondary heater cord;

the injection device combination power and communication output connector includes a second injection device communication output terminal and is configured for mating physical and electrical connection to the front end connector in a manner that is also capable of electrically connecting a second injection device communication output terminal in the injection device combination power and communication output connector to a second communications conductor in said one of the heater modules in the assembly; and a second injection device communication conductor electrically connects the second injection device communication input terminal of the injection device communication input connector to the second injection device communication output terminal of the injection device combination power and communication output connector.

30. A method of providing power to and communication data to or from a plurality of heater modules that are daisy-chain connected together, each of which heater modules comprises a heater element in a heater, a controller device connected to the heater by a primary heater cord, high voltage power conductors, neutral conductors, and communication conductors extending from the controller device, through the primary heater cord to the heater, and through a secondary heater cord extending from the heater for connection to the controller device of another one of the heater modules, the method comprising:

injecting power into a first one of the heater modules while passing communication data into or out of said first one of the heater modules by connecting a first power injection device to the first one of the heater modules and providing power from a high voltage power source through an injection device power input connector and out of an injection device combination power and communication output connector to the first one of the heater modules; and injecting auxiliary power into another one of the heater modules in the daisy-chain of heater modules by connecting a second power injection device into said another one of the heater modules and connecting the secondary heater cord of an intermediate heater module in the daisy chain of heater modules to the second power injection device to transmit communication data between the said another one of the heater modules and the said intermediate heater module through the power injection device.

31. A method of providing a water-resistant heater assembly that includes a plurality of heater modules connected electrically in daisy chain fashion, wherein each heater module has a heater containing a heating element powered by high voltage electric power and at least one temperature sensor positioned in the heater adjacent to the heater element, and wherein each heater module also has a controller device connected electrically to a high voltage power source and to the heater element and to the temperature sensor in the heater, comprising:

providing the controller device of each heater module with a housing that has an outside wall which is shaped substantially as a figure of revolution extending along a controller longitudinal axis between as housing front end shaped substantially as a figure of revolution that defines a front aperture and a housing back end shaped substantially as a figure of revolution that defines a back aperture, said housing having an external surface and enclosing an interior controller chamber;

positioning the control lea device a distance apart from the heater;

providing each heater module with no more than one electrical input connector and no more than one electrical output connector, said electrical input connectors and electrical output connectors 34 of the heater modules being connectable together in a water tight manner that resists leakage of water into contact with electrical conductors and the terminals in the electrical input connectors and electrical output connectors;

extending a high voltage power conductor, a neutral conductor, and at least one data communication conductor between the electrical input connector of the heater module and the electrical output connector of same heater module including through the housing of the controller device;

shrink-wrapping a water impermeable, protective shield around the housing of the controller; and connecting a plurality of heater modules together in daisy chain fashion by connecting the electrical output connectors of one or more heater modules to the electrical input connectors of one or more other heater modules.

32. Power injection apparatus for providing power to and communication data to or from a plurality of heater modules that are daisy-chain connected together, each of which heater modules comprises a heater element in a heater, a controller device connected to the heater by a primary heater cord, high voltage power conductors, neutral conductors, and communication conductors extending from the controller device, through the primary heater cord to the heater, and through a secondary heater cord extending from the heater for connection to the controller device of another one of the heater modules, comprising:

means for injecting power into a first one of the heater modules while passing communication data into or out of said first one of the heater modules; and means for injecting auxiliary power into another one of the heater modules in the daisy-chain of heater modules by connecting a second power injection device into said another one of the heater modules and connecting the secondary heater cord of an intermediate heater module in the daisy chain of heater modules to the second power injection device to transmit communication data between the said another one of the heater modules and the said intermediate heater module through the power injection device.

33. Apparatus for providing a water-resistant heater assembly that includes a plurality of heater modules connected electrically in daisy chain fashion, wherein each heater module has a heater containing a heating element powered by high voltage electric power and at least one temperature sensor positioned in the heater adjacent to the heater element, and wherein each heater module also has a controller device, connected electrically to a high voltage power source and to the heater element and to the temperature sensor in the heater, comprising:

means for providing the controller device of each heater module with a housing that has an outside wall which is shaped substantially as a figure of revolution extending along a controller longitudinal axis between a housing front end shaped substantially as a figure of revolution that defines a front aperture and a housing back end shaped substantially as a figure of revolution that defines a back aperture, said housing having an external, surface and enclosing an interior controller chamber;

means for positioning the controller device a distance apart from the heater with electrical conductive components extending between the controller device and the heater;

means for providing each heater module with no more than one electrical input connector and no more than one electrical output connector, said electrical input connectors and electrical output connectors of the heater modules being connectable together in a water tight manner that resists leakage of water into contact with electrical conductors and the terminals in the electrical input connectors and electrical output connectors;

means for extending a high voltage power conductor, a neutral conductor, and at least one data communication conductor between the electrical input connector of the heater module and the electrical output connector of same heater module including through the housing of the controller device;

a water impermeable, protective shield shrink-wrapped around the housing of the controller; and a plurality of heater modules connected together in daisy chain fashion with the electrical output connectors 34 of one or more heater modules connected to the electrical input connectors of one or more other heater modules.

* * * * *

UNITED STATES PATENT AND TRADEMARK OFFICE
CERTIFICATE OF CORRECTION

| | |
|---|---|
| PATENT NO. | : 9,686,821 B2 |
| APPLICATION NO. | : 14/263779 |
| DATED | : June 20, 2017 |
| INVENTOR(S) | : Jeffrey D. Kiernan, Karl Hausmann and Paul Dozoretz |

Page 1 of 1

It is certified that error appears in the above-identified patent and that said Letters Patent is hereby corrected as shown below:

In the Claims

In Column 25, Line 27, Claim 1 change "hack" to --back--.

In Column 26, Line 18, Claim 6 change "hack" to --back--.

In Column 27, Line 51, Claim 23 change "of" to --off--.

In Column 29, Line 3, Claim 28 change "hack" to --back--.

In Column 29, Line 12, Claim 28 change "heater module the power injection device, comprising:" to --heater module, the power injection device comprising:--.

In Column 29, Line 23, Claim 28 change "the least one" to --the at least one--.

In Column 31, Line 1, Claim 31 change "control lea" to --controller--.

In Column 32, Line 19, Claim 33 change "external," to --external--.

Signed and Sealed this
Twenty-eighth Day of August, 2018

Andrei Iancu
*Director of the United States Patent and Trademark Office*